United States Patent
Takada et al.

[11] Patent Number: 5,975,880
[45] Date of Patent: Nov. 2, 1999

[54] APPARATUS AND METHOD OF MOLDING HEAT-RESISTANT CONTAINERS

[75] Inventors: Minoru Takada; Koichi Sato; Kazuyuki Yokobayashi, all of Ueda; Kazuya Kitamura, Nagano; Atsushi Sakurai, Saku, all of Japan

[73] Assignee: Nissei ASB Machine Co., Ltd., Komoro, Japan

[21] Appl. No.: 08/980,373

[22] Filed: Nov. 28, 1997

Related U.S. Application Data

[63] Continuation of application No. 08/544,544, Oct. 18, 1995, abandoned.

[30] Foreign Application Priority Data

| Nov. 11, 1994 | [JP] | Japan | 6-303016 |
| Jul. 21, 1995 | [JP] | Japan | 7-207725 |

[51] Int. Cl.⁶ .................................................. B29C 49/18
[52] U.S. Cl. .................... 425/526; 425/530; 425/534; 425/538; 264/530; 264/905
[58] Field of Search .................... 264/530, 905, 264/906; 425/526, 534, 538, 539, 530

[56] References Cited

U.S. PATENT DOCUMENTS

| 3,957,934 | 5/1976 | Berggren et al. | 425/526 |
| 4,122,141 | 10/1978 | Krall et al. . | |
| 4,318,882 | 3/1982 | Agrawal et al. . | |
| 4,354,813 | 10/1982 | Collombin | 425/534 |
| 4,362,498 | 12/1982 | Harry et al. | 425/534 |
| 4,382,760 | 5/1983 | Wiatt et al. | 425/526 |
| 4,767,311 | 8/1988 | Gibbemeyer | 425/526 |
| 4,853,171 | 8/1989 | Ajmera . | |

FOREIGN PATENT DOCUMENTS

| 0 305 699 A2 | 3/1989 | European Pat. Off. . | |
| 0 387 737 A1 | 9/1990 | European Pat. Off. . | |
| 0 502 391 A2 | 9/1992 | European Pat. Off. . | |
| 0 515 702 A1 | 12/1992 | European Pat. Off. . | |
| 0 559 103 A1 | 9/1993 | European Pat. Off. . | |
| 1495719 | 9/1966 | France | 425/538 |
| 2 047 516 | 3/1971 | France . | |
| 2 239 332 | 2/1975 | France . | |
| 83 37 893 | 4/1987 | Germany . | |
| 59-002820 | 1/1984 | Japan | 264/905 |
| 3-205124 | 9/1991 | Japan . | |
| 1 480 647 | 7/1977 | United Kingdom . | |
| 2 004 805 | 4/1979 | United Kingdom . | |
| 2 093 396 | 9/1982 | United Kingdom . | |

*Primary Examiner*—Catherine Timm
*Attorney, Agent, or Firm*—Oliff & Berridge, PLC

[57] ABSTRACT

A heat-resistant container molding apparatus and method which are compact and inexpensive and can reliably increase the crystallinity, reduce the residual stress in a container filled with a hot content such as thermally sterilized fruit juice, and prevent a thermal deformation with improved container stability at a raised temperature. The apparatus has a receiving and removing unit for receiving primary moldings obtained by blow-molding preforms and for removing final products, a heat treatment section for heating the primary moldings by bringing the primary moldings into contact with the inner wall of a heat treatment mold while pressurizing the interior of the primary moldings within the heat treatment mold, a final molding section for blow molding intermittent moldings into final products within a final blow mold, and a rotary plate, neck support fixing plate and neck support member for conveying the moldings through the receiving and removing unit, heat treatment section and final molding section.

12 Claims, 17 Drawing Sheets

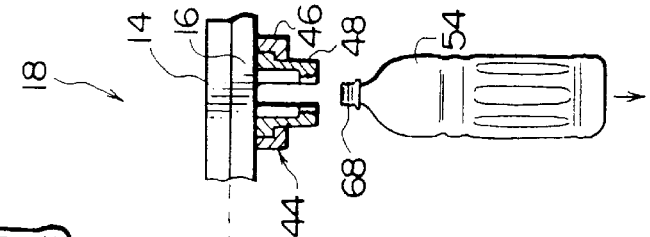
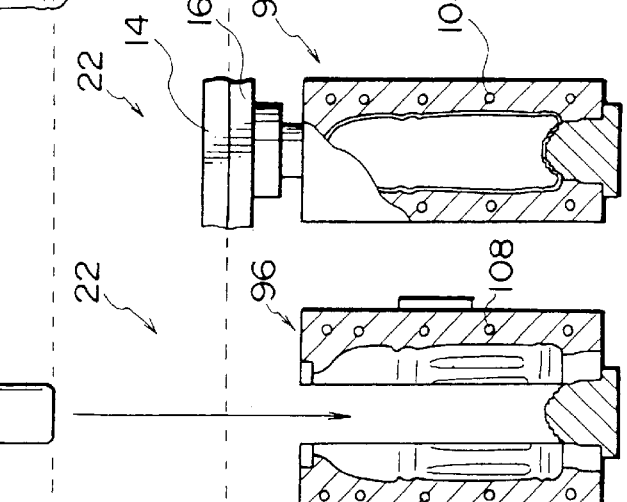
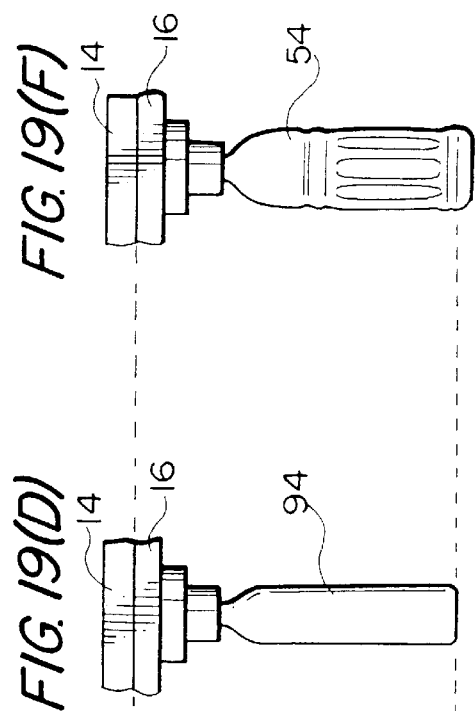
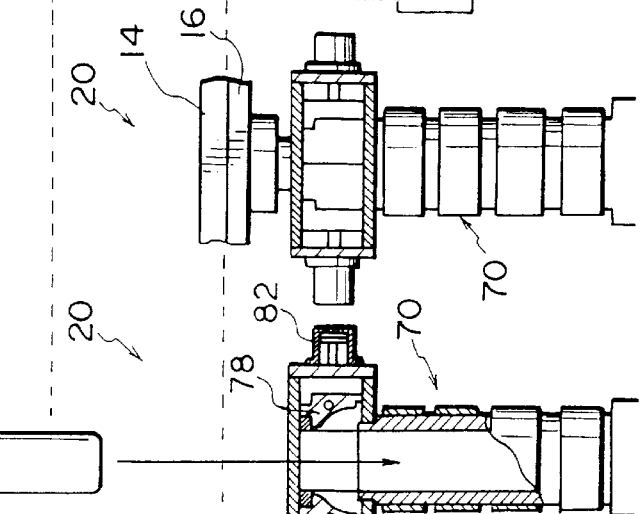
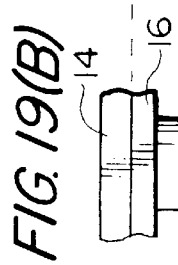
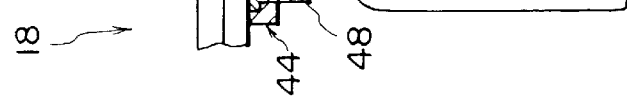

APPARATUS AND METHOD OF MOLDING HEAT-RESISTANT CONTAINERS

This is a Continuation of application Ser. No. 08/544,544 filed Oct. 18, 1995 now abandoned.

BACKGROUND OF THE INVENTION

1. Field of the Invention

The present invention relates to an apparatus and method of molding a heat-resistant container particularly from a synthetic resin such as polyethylene terephthalate (which will be called "PET").

2. Description of the Prior Art

In general, a synthetic resin thin-walled packaging container known as biaxial stretching blow molded container is formed by positioning an injection-molded or extruded preform having an appropriate temperature for stretching within a mold and stretching the preform in its longitudinal direction corresponding to the longitudinal axis of the container while at the same time expanding the same preform in its lateral direction under the action of a pressurized gas blown into the mold.

Depending on selection of a material used to form the container, however, a problem was raised in that the container deformed when it was filled with a hot content such as a thermally sterilized fruit juice beverage.

To overcome such a problem, a proposal such as the applicant's Japanese Patent Application Laid-Open No. 3-205124 has been made in which the blow molding step to be executed after the temperature of the preform has been regulated is divided into primary and secondary sub-steps. In the primary blow molding sub-step, a primary molding is formed in the desired form of a container. The primary molding is thermally processed to shrink and then subjected to the secondary blow molding sub-step to form the final container.

Such a proposed molding process can provide a heat-resistant container which is improved in mechanical strength through the thermal treatment before the secondary blow molding sub-step.

More particularly, the thermal treatment before the secondary sub-step removes a strain produced at the primary blow molding sub-step or a residual stress due to stretching, and crystallizes the oriented walls to a higher level. This improves the heat resistance of the final product which may be placed under a severe temperature condition in markets.

To attain such a heat-resistant container, it is required that the temperature of the primary molding has been increased sufficiently to improve the crystallinity in the primary molding at its oriented walls.

However, the prior art could not smoothly increase the temperature of the molding since the necessary heat was only transmitted to the molding through radiation within an atmosphere.

Therefore, a long time is required until the temperature of the molding reaches a level that can provide the necessary crystallinity for the molding to have its sufficient heat resisting property. Thus, time for heating or conveying the molding must be prolonged. This may extend the molding cycle or increase the dimensions of the container molding apparatus including the heating conveyor path.

SUMMARY OF THE INVENTION

It is therefore an object of the present invention to provide an inexpensive and compact apparatus and method of molding a heat-resistant container to be filled with a hot content such as a thermally sterilized fruit juice, which can increase the crystallinity of the container and also reduce the residual stress thereof in a reliable and short manner, resulting in improvement of the form stability at high temperature to avoid a thermal deformation.

Another object of the present invention is to provide a heat-resistant container molding apparatus and method of molding a heat-resistant container in an efficient blow molding manner without thermal loss.

Still another object of the present invention is to provide a heat-resistant container molding apparatus and method of molding a heat-resistant container, in which when a plurality of steps using clamping mechanisms are used, it can be prevented to increase the installation space due to a stroke required to open and close the respective mold.

A further object of the present invention is to provide a heat-resistant container molding apparatus and method of molding a heat-resistant container, in which a preform can be sufficiently cooled such that the blow molding step will not be influenced by the heat history of an injection molded preform.

To accomplish these objects, the present invention provides a heat-resistant container molding apparatus comprising:

a primary molding section for blow-molding preforms into primary moldings by using a primary blow mold having split molds;

a heat treatment section for heat treating the primary moldings to obtain intermediate moldings by bringing the primary moldings into contact with inner walls of a heat treatment mold having split molds while pressurizing an interior of each of the primary moldings within the heat treatment mold; and a final molding section for blow-molding the heat treated intermediate moldings into final products within a heated final blow mold having split molds.

According to the present invention, the heat transfer is carried out by heating the primary molding in direct contact with the inner wall of the heat treatment mold while pressurizing the interior of the primary molding. Therefore, the temperature of the molding can efficiently be increased for a short time. At the same time, the apparatus can be compacted. In addition, the residual stress produced in the primary molding can reliably be removed for a short time to increase the crystallinity of the primary molding. As a result, the form stability can be improved at a raised temperature reliably to prevent a container from being thermally deformed when the container is filled with a hot content such as a thermally sterilized fruit juice beverage or the like.

Since the heat shrinkage and thus uneven wall thickness is prevented by pressurizing the interior of the primary molding within the heat treatment mold, an uneven wall thickness and irregular heat resistance can reliably be prevented at the final blow molding step. Thus, a desired heat can certainly be provided to the molding without variability. This can stabilize the shrinkage in the intermediate molding after being heat-treated. Consequently, the wall-thickness distribution of the final product can also be stabilized.

In the final molding section after the heat treating step, a strain in the final product can be removed by heat treating it within the final heated blow mold when the intermediate molding is blow-molded into the final product in the final heated blow mold. Thus, the heat stability can be improved to increase the heat resistance in the final product.

In the apparatus of the present invention, it is preferred that it comprises a receiving section for receiving the preforms to be primarily molded and a removing section for removing the final products and wherein the primary molding, heat treatment and final molding sections being located adjacent to one another.

Since the primary molding, heat treatment and final molding sections are sequentially positioned, the final blow molding step can be carried out immediately after the heat treating step while maintaining the heat in the heat treated molding. Thus, the blow molding step can efficiently be performed without heat loss.

It is also preferable that the apparatus of the present invention further comprises conveyor means for intermittently conveying a given number of preforms to be simultaneously molded to the primary molding section and a given number of moldings to be simultaneously molded to the heat treatment and final molding sections respectively, and wherein each of the primary molding, heat treatment and final molding sections includes a mold clamping mechanism for clamping the split molds, the primary molding, heat treatment and final molding sections are rectilinearly disposed in a transfer direction.

Such mold clamping mechanisms require a stroke of opening and closing the split molds and thus an increased installation space. If the mold clamping mechanisms are disposed opposed to one another, the spacing between the adjacent conveyor means will unnecessarily be increased. This will also increase the installation space.

When the primary molding, heat treatment and final molding sections respectively having the mold clamping mechanisms are rectilinearly disposed in the direction of conveyance as in the present invention, the strokes of opening and closing the split molds can rectilinearly be taken in the same direction. Since the strokes of opening and closing the split molds in the mold clamping mechanisms are avoided from overlapping in the opposed direction, the installation space can be minimized. By executing the heat treatment using the heat treatment molds, further, the heat treatment can efficiently be carried out for a short time.

In such a case, it is preferable that the split molds of the heat treatment mold in the heat treatment section have cavity configuration substantially equal to that of the primary blow mold in the primary molding section and a mechanism for heating the heat treatment mold to a heat treatment temperature.

Since the primary moldings are brought into contact with and heated by the heat treatment molds which have been heated to the necessary heat treatment temperature by the heating mechanism, the temperature of the primary moldings can efficiently be raised for a short time. Further, the residual stress produced at the primary molding section can certainly be removed for a short time to provide an improved crystallinity. As a result, the form stability at a raised temperature can be improved certainly to avoid a container from being thermally deformed when it is filled with a high temperature content.

It is further preferable that the conveyor means forms a substantially rectangular conveyor path and the primary molding, heat treatment and final molding sections are disposed on a long side of the rectangular conveyor path.

In such an arrangement, the spacing between the long opposite sides of the conveyor path can be minimized to reduce the entire installation space.

It is further preferable that the receiving section is disposed on a short side of the conveyor path.

By disposing the primary molding, heat treatment and final molding sections requiring the mold opening/closing spaces on the one longer side of the conveyor path as described, a given spacing between the longer opposed sides of the conveyor path can be provided. If the receiving and removing sections are disposed on one shorter side of the conveyor path, the distance between the longer opposed sides of the conveyor path can be reduced.

It is preferable in this case that the receiving section is used as a removing section for removing final products.

The heating and heat treating sections need relatively longer time, while the receiving and removing steps in the receiving and removing sections do not relatively consume time. Therefore, such a single receiving/removing section can contribute to reduce the installation space.

It is further preferable that a plurality of heating units for heating preforms are disposed between the receiving section and the primary molding section.

Thus, the preform heating time can be sufficiently secured such that the preforms will certainly be heated to the blow molding temperature.

It is further preferable that the present invention includes a plurality of heating units for heating preforms received at the receiving section and wherein the plurality of heating units are disposed on at least one side of the conveyor path excluding the long side on which the primary molding, heat treatment and final molding sections are disposed.

Thus, the conveyor path of a conveyor having no mold clamping mechanism can effectively be used to secure an appropriate heating distance and thus a sufficient heating time.

In such a case, it is preferable that each of the heating units has a rotary mechanism for rotating the preforms.

The heating unit can uniformly heat the preform around the circumference thereof while being rotated by the rotary mechanism. This can avoid any uneven wall thickness in the product during the blow molding step.

It is further preferred that the conveyor means includes carrier members for conveying moldings to be simultaneously molded upside down and a conveyor chain mounted on the carrier members and engaged with sprockets which are disposed in the conveyor path at corners thereof, each of the carrier members having a rotating sprocket engaged with preform rotating means in each of the heating units.

In such an arrangement, the moldings are supported upside down on the respective carrier members and conveyed to the respective molding sections by the conveyor chain engaging the sprockets. At the same time, the carrier members and thus associated moldings are rotated about their own axes by the rotating sprockets engaging the preform rotating means at the respective heating units. Thus, the moldings can be heated uniformly around their circumferential direction to avoid any uneven wall thickness during the blow molding step.

In another aspect, it provides a heat-resistant container molding apparatus for molding a heat-resistant container, comprising:

a preform molding section for injection-molding preforms;

a heat-resistant container molding section for blow-molding the preforms into heat-resistant containers; and a conveyor line for conveying the preforms to the heat-resistant container molding section after removing the preforms from the preform molding section, the conveyor line including cooling means located at least at an upstream side for cooling the preforms.

According to this aspect, the preform removed from the preform molding section is conveyed to the heat-resistant container molding section through the conveyor line. In the heat-resistant container molding section, the preform is blow-molded into a heat-resistant container. During transfer through the conveyor line, the preform is forcedly cooled at least at the upstream side by the cooling means. This can avoid a sticking between adjacent preforms during transfer and also sufficiently cool the preforms through a short transfer distance.

It is preferable that the conveyor line includes preform rotating and conveying means for conveying the preforms while rotating them.

Thus, the preforms can be cooled uniformly around their circumference by rotating them through the preform rotating and conveying means while conveying in the conveyor line.

It is preferable that the preform rotating and conveying means includes upstream intermittent conveying means for intermittently conveying preforms to be simultaneously molded and downstream continuous conveying means for continuously conveying the preforms from the upstream intermittent conveying means.

Thus, the simultaneously injection-molded preforms from the upstream intermittent conveying means can be conveyed while maintaining a pitch between adjacent preforms during the injection molding step or preventing a sticking therebetween. The downstream continuous conveying means can convey the preforms in close contact with one another. This can avoid any excess transfer while securing sufficient preforms.

It is also preferable that the conveyor line provides a transfer distance and time which allow preforms to be cooled to a temperature sufficiently lower than a blow-molding temperature.

Thus, the blow molding step will not be influenced by the heat history of the injection-molded preforms. According to the present invention, further, the conveyor line can more compactly be formed by conveying the preforms, unlike the prior art machines wherein the primary moldings are conveyed.

The present invention further provides a method of molding a heat-resistant container, comprising:

a primary molding step for blow-molding injection molded preforms into primary moldings in a primary blow mold;

a heat treating step for heat treating the primary moldings to obtain intermediate heat treated moldings by bringing the primary moldings into contact with an inner wall of a heat treatment mold while pressurizing an interior of each of the primary moldings within the heat treatment mold; and a final molding step for blow-molding the intermediate heat treated moldings into final products in a final blow mold.

According to the present invention, any residual stress produced in the primary molding step can certainly be removed to provide an improved crystallinity by heat treating the primary molding obtained by the primary blow molding step within the heat treatment mold at the heat treating step. As a result, the form stability can be improved at a raised temperature reliably to avoid any thermal deformation in a container when it is filled with a hot content.

It is preferable that the method of the present invention also comprises the steps of:

receiving preforms prior to the primary molding step; and removing final products after the final molding step.

It is also preferable that a plurality of preform heating steps are carried out between the receiving step and the primary molding step.

Each of the plurality of preform heating steps includes the step of rotating the preforms while heating them.

It is further preferred in the present invention that a primary molding has a height slightly larger than that of a final product and a diameter slightly smaller than that of the final product barrel, thereby providing a margin compensating the heat shrinkage when the primary molding is thermally treated. In such a case, it is preferable that the intermediate molding after heat treated is formed into a size slightly smaller than that of the final product and has a sufficient wall-thickness distribution in its height direction. Thus, the intermediate molding will not be pinched in its diametrical direction by the final blow mold when it is closed. By providing the intermediate molding having its size slightly larger than that of the final product, thus, the intermediate molding will not be stretched in the final blow molding step. Therefore, only a few strain can be produced in the final blow molding step. Additionally, the strain thus produced can substantially completely be removed by heating the final blow mold. As a result, the heat stability can be improved in the final product.

If the heat treatment step is so designed that the intermediate molding has its size substantially equal to or slightly smaller than that of the final product, depending on the heat treatment temperature and time, the intermediate molding can be controlled at the heat treatment step such that it has a size substantially equal to or slightly smaller than that of the final product.

Where a primary molding has its cylindrical barrel having substantially no tongued and grooved face, the barrel may have no axial undercut and be formed with a circumferentially integral pot-shaped part corresponding to the cylindrical barrel of the heat treatment mold. Thus, only the shoulder of the primary molding can be formed through a split mold, resulting in minimization of the other expensive split mold sections. Furthermore, this permits a large-sized mold clamping mechanism to be omitted, thereby reducing the manufacturing cost of the entire system and its installation area.

If the heating temperature at the final blow mold is equal to or higher than a desired heat-resisting temperature, the heat stability at that heat-resisting temperature can be improved to avoid any deformation in a container thereat.

It is further preferable that the primary molding has a diameter larger than that of the final product and a height about 10% larger than that of the final product. Thus, the intermediate molding can be formed such that it will have a size substantially equal to or slightly smaller than that of the final product through the shrinkage after the heat treatment of the primary molding. This prevents the molding from being pinched by the final blow mold.

If the heat treatment time in the heat treating step is set between five seconds and ten seconds, the size of the intermediate molding can be stabilized while shortening the molding cycle. More particularly, if the heat treatment time is less than five seconds, the shrinkage in the intermediate molding will be unstable to scatter the size of the intermediate molding. If the heat treatment time exceeds ten seconds, the molding cycle becomes too long. It is thus preferable that the heat treatment time is in the range of five to ten seconds.

If the blow molding time in the final molding step is set between five seconds and fifteen seconds, a practical heat-set effect can be provided to minimize the molding cycle.

According to a further aspect, the present invention provides a method of molding a heat-resistant container, comprising:

a preform molding step for injection-molding preforms;

a conveying step for removing the injection molded preforms from the preform molding step and conveying the preforms to a conveyor line; and a heat-resistant container molding step for receiving and heating the preforms conveyed by the conveyor line and subsequently blow-molding the preforms into heat-resistant containers, the conveying step including a cooling step located at least at an upstream side of the conveyor line for cooling the preforms.

In such an arrangement, the conveying step preferably includes the step of rotating the preforms while conveying them.

In a further aspect, the present invention provides a heat-resistant container molding apparatus for molding a heat-resistant container, comprising:

a receiving section for receiving primary moldings obtained by blow-molding preforms;

a heat treatment section for bringing the primary moldings received by the receiving section into contact with an inner wall of a heat treatment mold and for heat treating the primary moldings while pressurizing an interior of each of the primary moldings within the heat treatment mold, whereby intermediate moldings are obtained;

a final molding section for blow-molding the intermediate heat-treated moldings into final products in a heated final blow mold;

a removing section for removing the final products; and conveyor means for conveying the moldings to the receiving, heat treatment, final molding and removing sections.

According to this aspect, the apparatus is defined by the primary molding receiving section, the heat treatment section, the final molding section and the removing section which are separated from one another. This enables the injection-molding and primary blow molding devices to be omitted from the apparatus of the present invention, resulting in a compacted system. If an existing blow-molding machine is used as a primary molding device, a heat-resistant container molding system can simply be formed only by connecting the apparatus of the present invention to that blow molding machine.

It is preferred in the present invention that receiving and removing unit replaced with the receiving and removing sections, heat treatment section and final molding section are disposed at three points which are equidistant from a center point and wherein the conveyor means comprises split type neck support members for grasping necks of the moldings, a neck support fixing plate formed by a split plate for holding and allowing the neck support members to be open and closed, and a rotary plate for supporting the neck support fixing plate at positions corresponding to the receiving and removing unit, heat treatment section and final molding section and for rotatably conveying the neck support fixing plate to positions corresponding to the receiving and removing unit, heat treatment section and final molding section.

Thus, the molding can be moved to the receiving and removing unit, heat treatment section and final molding section merely by intermittently rotating the rotary plate through 120 degrees. This can simplify the conveying means. If the receiving and removing unit, heat treatment section and final molding section are disposed within the rotating locus of the rotary plate, the respective sections can efficiently be disposed to improve the installation space.

It is further preferably that the conveying means has a rectilinear conveyor path and the heat treatment section is located adjacent to the final molding section on the rectilinear conveyor path.

Thus, the primary molding is heat treated and finally blow molded along the rectilinear conveyor path. The final blow molding step can be carried out immediately after the heat treatment step while maintaining the heat treat. The blow molding step can efficiently be performed without heat loss.

In a further aspect, the present invention provides a method of molding a heat-resistant container, comprising:

a receiving step for receiving primary moldings obtained by blow-molding preforms;

a heat treating step for bringing the primary moldings received by the receiving step into contact with an inner wall of a heat treatment mold and for heat treating the primary moldings while pressurizing an interior of each of the primary moldings within the heat treatment mold, whereby intermediate moldings are obtained;

a final molding step for blow-molding the intermediate heat-treated moldings into final products in a heated final blow mold; and a removing step for removing the final products.

BRIEF DESCRIPTION OF THE DRAWINGS

FIG. 19 illustrates one embodiment of a method for molding a heat-resistant container in accordance with the present invention.

DETAILED DESCRIPTION OF THE PREFERRED EMBODIMENTS

Several preferred embodiments of the present invention will now be described in detail with reference to the drawings.

Figure 1:
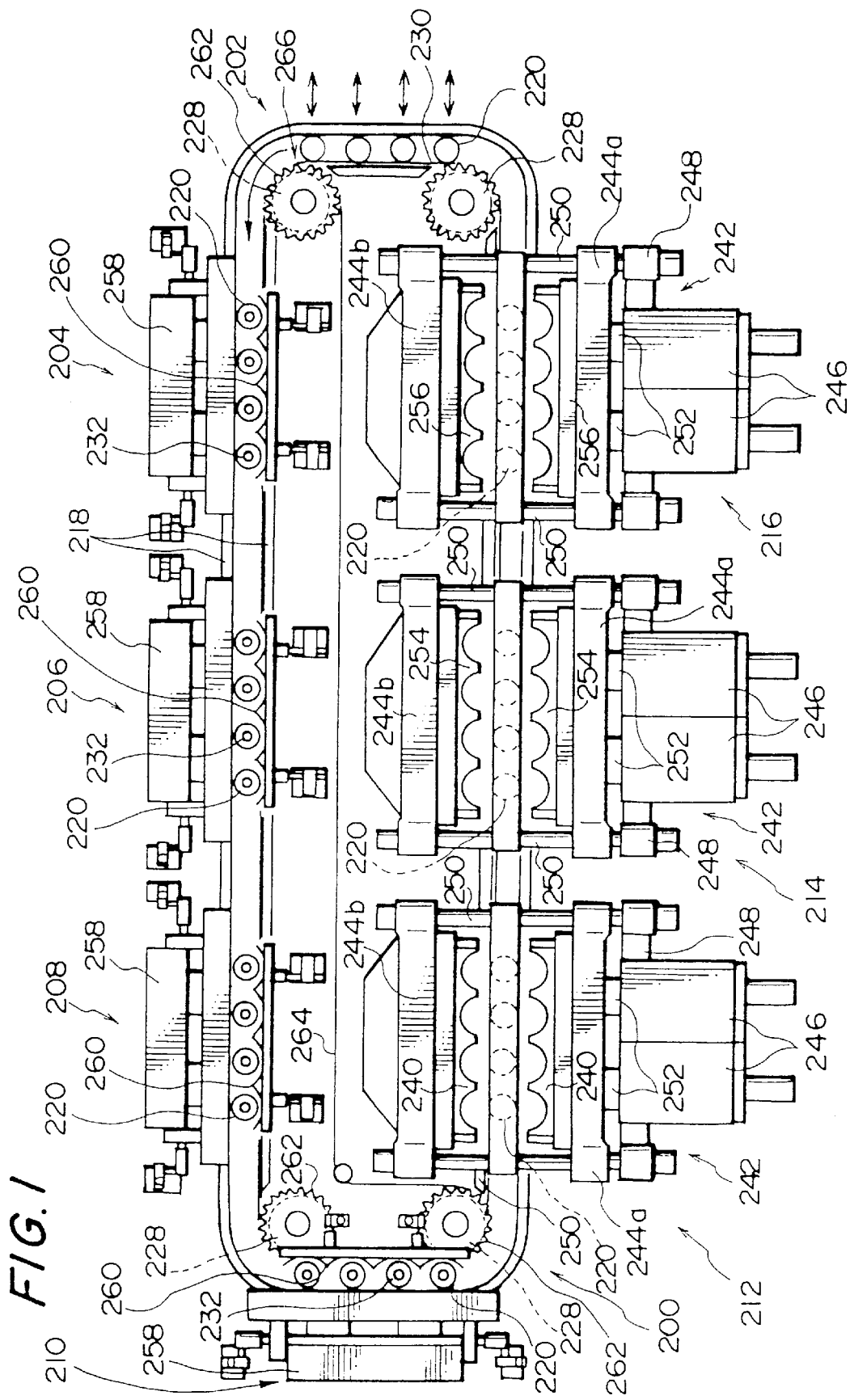
FIG. 1 is a plan view of one embodiment of a heat-resistant container molding apparatus constructed in accordance with the present invention.

FIG. 1 is a view of one embodiment of a heat-resistant container molding apparatus constructed in accordance with the present invention.

The heat-resistant container molding apparatus is so designed as to heat and blow mold preforms which have been injection molded by a separate injection molding machine.

The apparatus comprises a receiving/removing section 202, first to fourth heating sections 204, 206, 208 and 210, a primary molding section 212, a heat treatment section 214 and a final molding section 216, all of which are arranged along a loop-like conveyor means 200.

The conveyor means 200 intermittently moves to carry a given number of every moldings to be simultaneously molded by this heat-resistant container molding apparatus (four in this embodiment), such as preforms from the receiving/removing section 202, primary moldings from the primary molding section 212 and final products from the final molding section 216, from the receiving/removing section 202 through the first to fourth heating sections 204, 206, 208 and 210, primary molding section 212 and heat treatment section 214 to the final molding section 216. The conveyor means 200 forms a substantially rectangular conveyor path along which a pair of conveyor rails 218 are disposed. The conveyor rails 218 are in engagement with the carrier members 220 at eight points spaced away from one another with a given pitch for every set of four moldings to be simultaneously formed.

Figure 2:
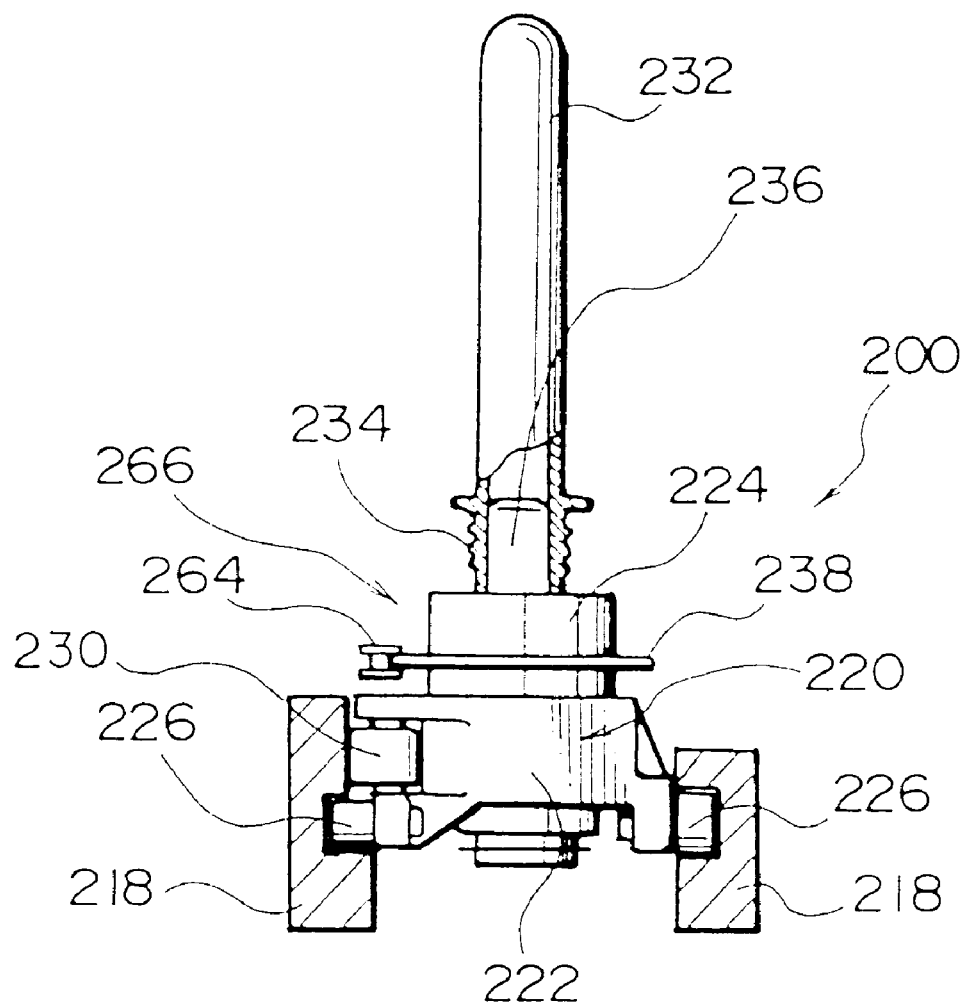
FIG. 2 is a longitudinal sectional view of a carrier member shown in FIG. 1.

Each of the carrier members 220 comprises a fixing portion 222 and a placement base 224, as shown in FIG. 2. The fixing portion 222 engages the conveyor rails 218 through cam followers 226 and also a conveyor chain 230 passing around conveyor sprockets 228 which are disposed in the conveyor path at four corners. When the conveyor chain 230 is driven, the carrier members 220 will be moved.

The placement base 224 is rotatably mounted on the fixing portion 222. The top of the placement base 224 includes a conveyor pin 236 adapted to be inserted into the neck 234 of a preform 232 for supporting the preform 232 upside down. The placement base 224 also includes a preform rotation sprocket 238 through which the placement base 224 and thus the preform 232 supported thereon is rotated.

The primary molding section 212, heat treatment section 214 and final molding section 216 are disposed on one longer side of the rectangular conveyor path formed by the conveyor means 200. The receiving/removing section 202 is disposed on one shorter side of the rectangular conveyor path adjacent to the final molding section 216. The first to third heating sections 204, 206 and 208 are disposed on the other longer side of the conveyor path while the fourth heating section 210 is disposed on the other shorter side of the conveyor path.

The primary molding section 212 blow molds a preform 232 into a primary molding after the preform has been heated through the first to fourth heating sections 204, 206, 208 and 210. The primary molding section 212 includes primary blow mold halves 240 defining a split mold. The primary blow mold halves 240 can be clamped and opened by a mold clamping mechanism 242.

The mold clamping mechanism 242 comprises a pair of mold clamping plates 244a, 244b, a movable plate 248, four tie rods 250 and a pair of driving cylinders 246. The mold clamping plates 244a and 244b support the primary blow mold halves 240, respectively. The movable plate 248 is disposed adjacent to the mold clamping plates 244a. The four tie rods 250 extend through the mold clamping plate 244a and slidably support it. The mold clamping plate 244b is fixedly connected to the movable plate 248 through the four tie rods 250. The driving cylinders 246 are mounted on the movable plate 248. Each of the driving cylinders 246 has a piston rod 252 fixedly connected to the mold clamping plate 244a. The piston rods 252 move the mold clamping plate 244a to the mold clamping or opening position, with the reaction force thereof moving the movable plate 248. The movement of the plate 248 moves the mold clamping plate 244b to the mold clamping or opening position through the tie rods 250.

The heat treatment section 214 heats the primary molding blow-molded by the primary molding section 212 to remove a strain such as residual stress which is produced by the stretching in the primary blow molding step, resulting in improvement of the heat resistance in the molding. The heat treatment section 214 includes heat treatment mold halves 254 defining a split mold. The heat treatment mold halves 254 can be clamped or opened by a mold clamping mechanism 242. The heat treatment mold halves 254 are substantially of the same configuration as in the primary blow mold halves 240 and will be heated by a heating mechanism (not shown). The heat treatment section 214 heats the primary molding by bringing it into contact with the inner wall of the heat treatment mold halves 254 while pressurizing the interior of the primary molding within the heat treatment mold halves 254. This shortens the heat treatment time and thus the molding cycle. The mold clamping mechanism 242 is of the same structure as the mold clamping mechanism for the primary blow mold halves 240.

The final molding section 216 blow-molds the primary molding heated by the heat treatment section 214 into a final product and thus includes final blow mold 256 defining a split mold. The final blow mold 256 can be clamped and opened by a mold clamping mechanism 242. The final molding section 216 heats the final blow mold 256 by a heating mechanism. The primary molding is blow-molded into a final product within the final blow mold 256 heated by the heating mechanism. Thus, a strain produced at the final blow molding step can be removed by heat treatment through the heated final blow mold 256, resulting in improvement of the heat stability and thus the heat resistance. The mold clamping mechanism 242 is of the same structure as the mold clamping mechanisms used for the primary blow mold halves 240 and heat treatment mold halves 254.

As will be apparent from the drawings, the primary molding section 212, heat treatment section 214 and final molding section 216 all of which require the motion stroke for clamping and opening the split molds are rectilinearly disposed on one longer side of the rectangular conveyor path defined by the conveyor means 200. This prevents the spacing between the opposite sides of the conveyor means 200 from being unnecessarily widened, unlike the prior art in which these sections are disposed opposed to one another. Consequently, the distance between the longer sides of the conveyor path formed by the conveyor means 200 can be minimized to save the installation space.

The receiving/removing section 202 receives injection-molded preforms 232 and transfers them onto the carrier members 220 in the conveyor means 200, as shown in FIG. 2. Further, the receiving/removing section 202 can externally remove the final products formed by the final molding section 216. For such a purpose, the receiving/removing section 202 includes an appropriate receiving/removing device (now shown). The receiving/removing section 202 is disposed on one shorter side of the rectangular conveyor path defined by the conveyor means 200, utilizing the length of the shorter sides of the rectangular conveyor path being elongated by the motion stroke in the mold clamping mechanism 242 when the primary molding section 212, heat treatment section 214 and final molding section 216 are disposed on one longer side of the rectangular conveyor path. Thus, the conveyor path can effectively be used to provide a further saved installation space.

When the primary molding section 212, heat treatment section 214 and final molding section 216 are located adjacent one another, the primary molding can immediately be blow-molded into a final product while maintaining heat provided by heat treating of the primary molding. Thus, the blow molding step can efficiently be carried out without heat loss.

The first to fourth heating sections 204, 206, 208 and 210 heat the preforms 232 from the receiving/removing section 202 to an appropriate blow molding temperature. Each of the heating sections 204, 206, 208 and 210 comprises a heating device 258 disposed outside the conveyor path and a reflecting plate 260 located inside the conveyor path at a position opposite to the heating device 258.

Although not illustrated, the heating device 258 may include a plurality of heaters which are disposed along the direction of conveyance and arranged vertically. The reflecting plate 260 is disposed at a position corresponding to four intermittently conveyed preforms 232 to be simultaneously molded and parallel to the axis of the preforms 232.

A preform rotation mechanism 266 includes a preform rotation chain 264 extending along a line on which the first to fourth heating sections 204, 206, 208 and 210 are located and passing around sprockets 262. The preform rotation chain 264 engages with the preform rotation sprockets 238 of the placement bases 224 of the carrier members 220. Thus, the placement bases 224 and thus the preforms 232 thereon can be rotated through the preform rotation chain 264.

Thus, the preforms 232 being intermittently conveyed by the conveyor means 200 can be rotated by the preform rotation mechanism 266 at the stop position in each of the first to fourth heating sections 204, 206, 208 and 210 such that the preforms 232 can uniformly be heated around their circumferences.

The fourth heating section 210 is disposed on the other shorter side of the conveyor path opposite to the receiving/removing section 202. This enables the conveyor path to be effectively used for reducing the installation space by utilizing the length of the shorter sides of the conveyor path being elongated by disposing the primary molding section 212, heat treatment section 214 and final molding section 216 on one longer side of the conveyor path, each of the sections having its own mold clamping mechanism 242.

According to this embodiment, the carrier members 220 of the conveyor means 200 receive the preforms 232 from the receiving/removing section 202 and intermittently move them through the first to fourth heating sections 204, 206, 208 and 210. The preforms 232 are heated by the heating sections while being rotated by the preform rotation mechanism 266. After passed through the fourth heating section 210, the preforms 232 are blow molded into primary moldings at the primary molding section 212. The primary moldings are then heated at the heat treatment section 214 and finally blow-molded into final products at the final molding section 216. The final products are transferred from the final molding section 216 to the receiving/removing section 202 from which the final products are externally removed.

FIGS. 3–9 show another embodiment of a heat-resistant container molding apparatus constructed in accordance with the present invention.

The heat-resistant container molding apparatus comprises a preform molding section 302 for injection-molding preforms 300, a heat-resistant container molding section 304 for blow-molding the preform 300 into heat-resistant containers and a conveyor line 306 for receiving and conveying the preforms 300 from the preform molding section 302 to the heat-resistant container molding section 304.

The preform molding section 302 comprises an injection molding portion 308, a preform removing portion 310 and a rotary carrying means 312 for conveying the preforms 300 from the injection molding portion 308 to the preform removing portion 310 while rotating the preforms 300.

The injection molding portion 308 comprises an injection device 314 and an injection mold (not shown) connected to the injection device 314. The injection molding portion 308 illustrated is adapted to form four preforms 300 simultaneously. In this embodiment, each of the preform molding section 302 and heat-resistant container molding section 304 is adapted to handle every four preforms that are simultaneously molded. However, the number of preforms to be handled by these sections may optionally be selected depending on the heat treatment time (e.g., eight preforms at the preform molding section 302 and four preforms at the heat-resistant container molding section 304).

The preform removing portion 310 is located at a position opposite to the injection molding portion 308 and removes the preforms 300 from the rotary carrying means 312 at each time when the preforms 300 are moved from the injection molding portion 308 to the preform removing portion 310 through 180 degrees by the rotary carrying means 312 after the preforms 300 have been injection-molded at the injection molding portion 308.

The rotary carrying means 312 includes four split neck molds (not shown) mounted thereon at a position corresponding to each of the injection molding portion 308 and preform removing portion 310. Each of the neck molds is adapted to receive an injection core mold (not shown). When a preform 300 is held by the corresponding neck and core molds, it is then moved from the injection molding portion 308 to the preform removing portion 310 at which the preform 300 will be removed by a removing mechanism (not shown).

The heat-resistant container molding section 304 is of the same structure as that of the heat-resistant container molding device shown in FIGS. 1 and 2 wherein the receiving/ removing section 202, first to fourth heating sections 204, 206, 208 and 210, primary molding section 212, heat treatment section 214 and final molding section 216 are disposed on the rectangular conveyor path defined by the conveyor means 200, except that such a receiving/removing device 316 as will be described is disposed in the receiving/ removing section 202. Therefore, the heat-resistant container molding section 304 will not further be described except the receiving/removing device 316.

The conveyor line 306 is used to convey the preforms 300 removed by the preform removing portion 310 of the preform molding section 302 to the receiving/removing section 202 of the heat-resistant container molding section 304. As the preforms 300 are being conveyed in such a manner, they are cooled before the preforms 300 are moved into the heat-resistant container molding section 304.

If the temperature of the preforms 300 is cooled to a level sufficiently lower than the blow molding temperature at the heat-resistant container molding section 304, the influence of heat history can be reduced. For such a purpose, the conveyance distance and time are set such that the preforms 300 are cooled preferably to a temperature equal to or lower than about 50° C. and more preferably to about 30° C. In such a case, it is preferred that the conveyance time is about five minutes. However, the conveyance time may optionally be selected depending on the wall-thickness of the preforms.

The conveyor line 306 includes a preform rotating and conveying means 318 for conveying the preforms 300 while rotating them.

The preform rotating and conveying means 318 comprises an upstream intermittent conveying means 320 for intermittently conveying every given number of rotating preforms 300 to be simultaneously formed (four) and a downstream continuous conveying means 322 for receiving and continuously conveying the rotating preforms 300 from the intermittent conveying means 320. The intermittent conveying means 320 conveys the preforms 300 while maintaining a pitch set at the preform removing portion 310 of the preform molding section 302 such that the preforms 300 will not stick to one another during the conveyance. The continuous conveying means 322 preferably adjusts the conveyance speed such that the preforms 300 will be conveyed in close contact with one another to be sufficiently gathered. The intermittent conveying means 320 has a connection to the preform removing portion 310 of the preform molding section 302, such a connection part being arranged parallel to the array of preforms in the preform removing portion 310. The continuous conveying means 322 has a connection to the receiving/removing section 202 of the heat-resistant container molding section 304, the connection part being arranged perpendicular to the receiving/removing section 202.

Figure 3:
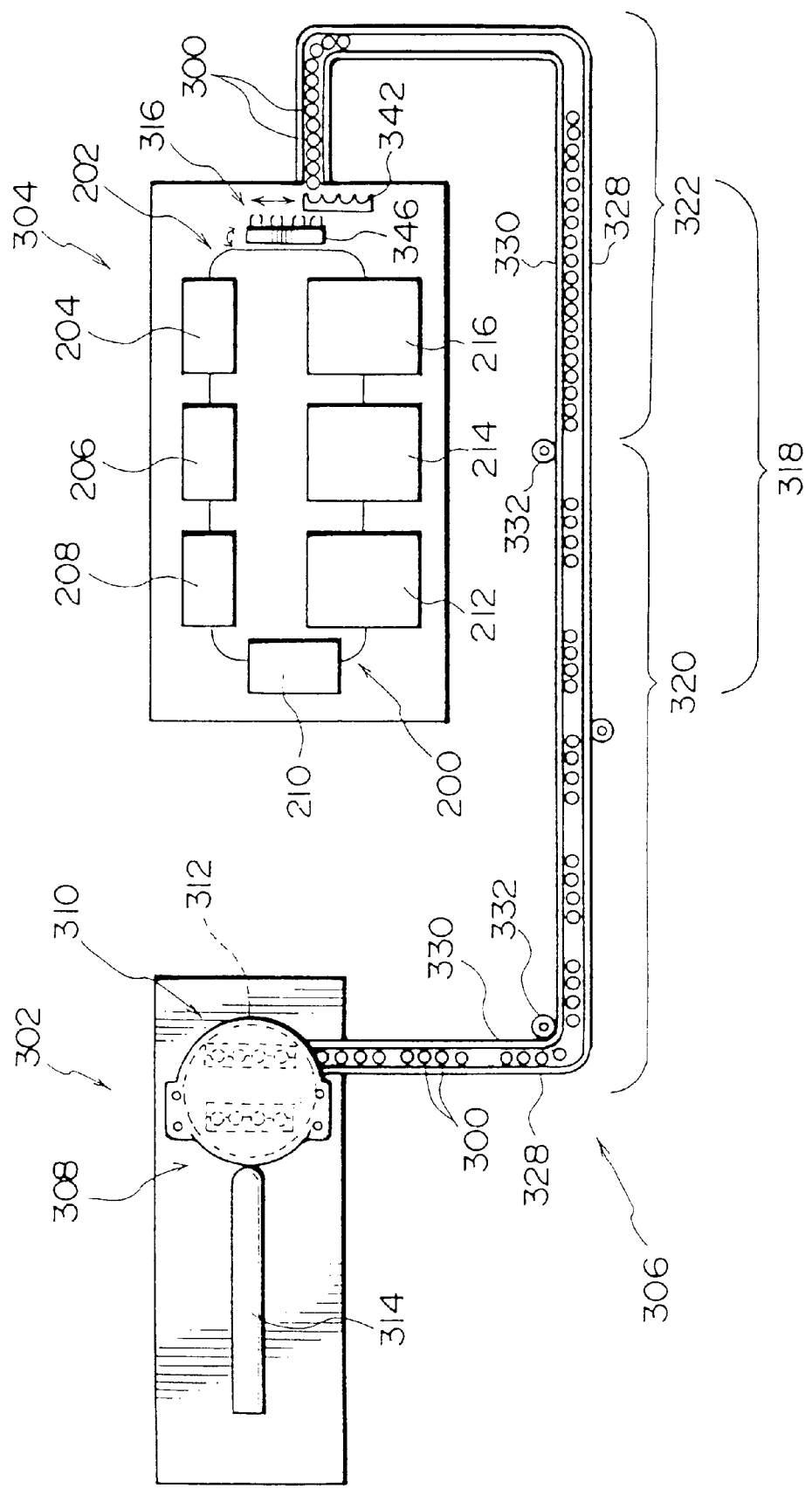
FIG. 3 is a plan view of another embodiment of a heat-resistant container molding apparatus constructed in accordance with the present invention.
Figure 4:
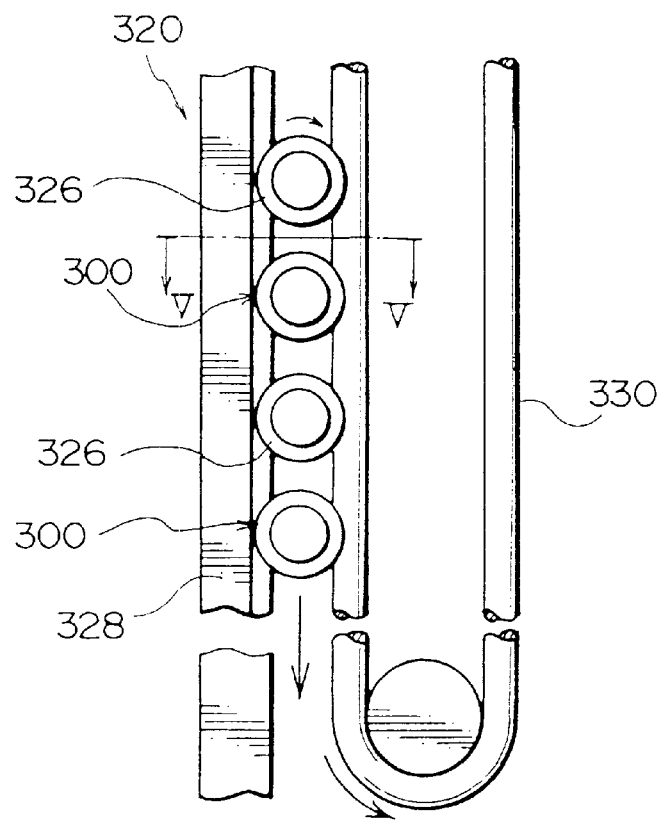
FIG. 4 is a fragmentary plan view, on an enlarged scale, of the conveyor line shown in FIG. 3.
Figure 5:
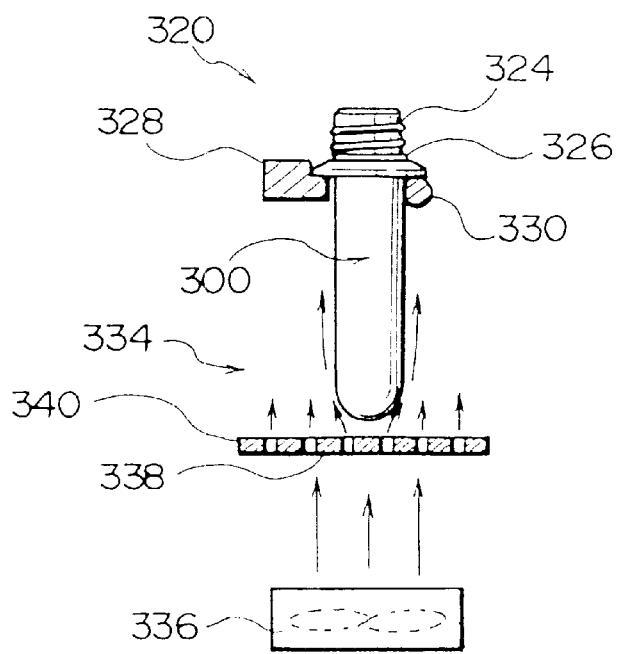
FIG. 5 is a longitudinal sectional view taken along a line V—V in FIG. 4.

The intermittent and continuous conveying means 320, 322 comprise a guide rail 328, a conveyor belt 330 and a belt drive motor 332 (see FIGS. 3 to 5).

The guide rail 328 supports the bottom of a support ring 326 in a neck 324 of each preform 300. The conveyor belt 330 is disposed parallel to the guide rail 328 and also supports the bottom of the support ring 328 in each preform neck such that the preform will be held between the conveyor belt 330 and the guide rail 328. The belt drive motor 332 moves the conveyor belt 330 intermittently in the intermittent conveying means 320, and moves the conveyor belt 330 continuously in the continuous conveying means 322.

The intermittent conveying means 320 further includes a cooling means 334 for cooling the preforms 300, as shown in FIG. 5. The cooling means 334 forcibly cools the preforms 300 and reliably prevents sticking of the preforms 300. This can reduce the conveyance distance in the intermittent conveying means 320. In addition, the continuous conveying means 322 may include a further cooling means to improve the cooling effect.

The cooling means 334 comprises an axial fan 336 located below the conveyor path and a perforated plate 340 disposed between the axial fan 336 and the conveyor path, the plate 340 having a number of small apertures 338. Thus, a flow of cooling air can be uniformly provided for the preforms 300 being conveyed.

In such a manner, the preforms 300 removed from the preform removing portion 310 of the preform molding section 302 are intermittently conveyed by the intermittent conveying means 320 for every number of simultaneously formed preforms. The preforms 300 are then supplied to the receiving/removing section 202 of the heat-resistant container molding section 304 by the continuous conveying means 322 while the preforms are in close contact with one another. Therefore, the preforms 300 just removed from the preform removing portion 310 can be conveyed in close contact with one another and without sticking under such a state that they are sufficiently cooled. Thus the preforms can be gathered sufficiently.

The preforms 300 gathered in close contact with one another by the continuous conveying means 322 are then transferred to the conveyor means 200 of the heat-resistant container molding section 304 by the receiving/removing device 316 disposed in the receiving/removing section 202 of the heat-resistant container molding section 304.

The receiving/removing device 316 comprises a pitch changing mechanism 342 and a receiving/removing mechanism 346.

The pitch changing mechanism 342 provides a pitch set for simultaneous molding in the heat-resistant container molding section 304 to the preforms 300 conveyed from the continuous conveying means 322 in close contact with one another.

Figure 6:
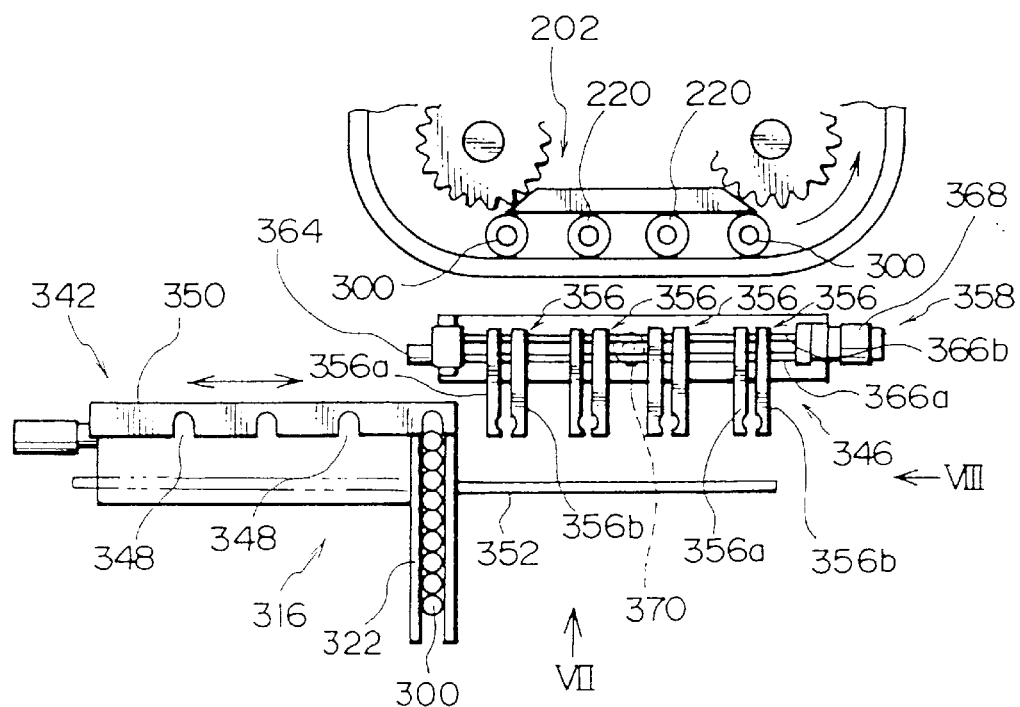
FIG. 6 is a plan view, on an enlarged scale, of the receiving/removing section shown in FIG. 4.
Figure 7:
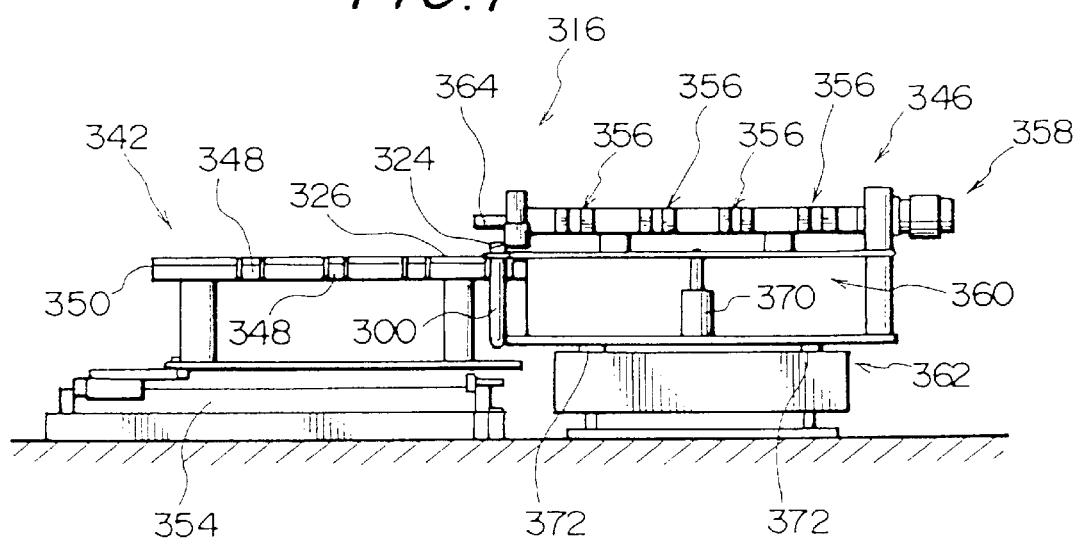
FIG. 7 is a side view as viewed in a direction of arrow VII in FIG. 6.
Figure 8:
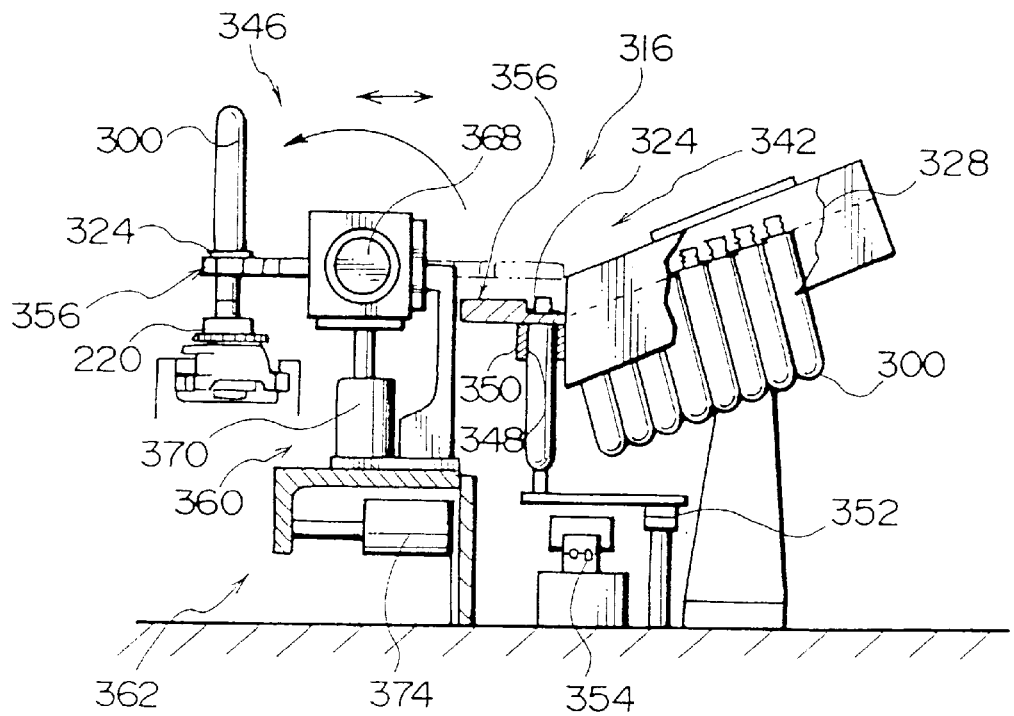
FIG. 8 is a side view as viewed in a direction of arrow VIII in FIG. 6, showing the receiving/removing section under its reception state.

The pitch changing mechanism 342 comprises a pitch changing member 350, a linear guide rail 352 and a rodless cylinder 354, as shown in FIGS. 6–8. The pitch changing member 350 is arranged parallel to a pat of the conveyor means 200 at the receiving/removing section 202 and perpendicular to the continuous conveying means 322 in contact with it. The pitch changing member 350 has preform support recesses 348 equal in number to the preforms to be simultaneously molded, these recesses 348 being formed in the side of the pitch changing member 350 contacting the continuous conveying means 322 with a pitch set for simultaneous molding in the heat-resistant container molding section 304. The linear guide rail 352 guides the pitch changing member 350 parallel to the conveyor means 200 at the receiving/removing section 202 toward a position corresponding to the carrier members 220. The rodless cylinder 354 moves the pitch changing member 350 along the linear guide rail 352.

As the pitch changing member 350 is moved to the conveyor means 200 along the linear guide rail 352 by the rodless cylinder 354, the preforms 300 gathered in close contact with one another at the continuous conveying means 322 are sequentially received by the respective preform support recesses 348 of the pitch changing member 350 such that the preforms 300 will be positioned corresponding to the carrier members 220 in the receiving/removing section 202 with the pitch for simultaneous molding.

The receiving/removing mechanism 346 receives and transfers the preforms 300 from the pitch changing mechanism 342 to the carrier members 220 of the conveyor means 200 at the receiving/removing section 202. The receiving/removing mechanism 346 also receives and removes final products 344 (see FIG. 9) from the carrier members 220 when they are conveyed from the final molding section 216 to the receiving/removing section 202 after one cycle has terminated in the heat-resistant container molding section 304.

The receiving/removing mechanism 346 comprises four chucks 356, an inverting mechanism 358, a lifting mechanism 360 and a horizontal drive mechanism 362. The chucks 356 can open and close, and are disposed at a position opposing to the position in which the carrier members 220 of the conveyor means 200 are stopped in the receiving/removing section 202 of the heat-resistant container molding section 304. The inverting mechanism 358 inverts the chucks 356 between the pitch changing mechanism 342 and the conveyor means 200. The lifting mechanism 360 lifts the chucks 356 up and down between a height corresponding to the carrier members 220 of the conveyor means 200 and the pitch changing member 350 and another height slightly higher than the above height. The horizontal drive mechanism 362 moves the chucks 356 in the horizontal direction between a position corresponding to the carrier members 220 and another position corresponding to the preform support recesses 348 in the pitch changing member 350.

More particularly, each of the chucks 356 is formed by a pair of chuck members 356a and 356b. The chuck members 356a and 356b can be opened and closed by a pair of opening/closing rods 366a and 366b which are slidably moved in the opposite directions by a chuck drive cylinder 364. More particularly, the opening/closing rods 366a and 366b are slidable in the opposite directions through an interlocking mechanism such as rack-and-pinion mechanism or the like. One of the opening/closing rods 366a or 366b fixedly supports one of the chuck members 356a or 356b. The other chuck member 356b or 356a is fixedly mounted on the other opening/closing rod 366b or 366a. As one of the opening/closing rods 366a or 366b is driven by the chuck drive cylinder 364 connected thereto, both the opening/closing rods 366a and 366b are slidably moved in the opposite directions through the interlocking mechanism so that the chuck members 356a and 356b fixedly mounted on the respective rods will be moved toward or away from each other to close or open the chuck 356.

The inverting mechanism 358 is connected to each of the opening/closing rods 366a and 366b at one end. The inverting mechanism 358 comprises an inverting actuator 368 which rotates to move the opening/closing rods 366a and 366b as a unit so as to invert the chucks 356 between the conveyor means 200 and the pitch changing mechanism 342.

The lifting mechanism 360 comprises a lifting cylinder 370 for supporting the chucks 356 and inverting mechanism 358 for up-and-down movement. As the chucks 356 and inverting mechanism 358 are moved upward or downward, the preforms 300 are received or removed.

The horizontal drive mechanism 362 comprises a horizontal guide 372 for guiding the lifting mechanism 360 between a receiving position at which the preforms 300 are received from the pitch changing mechanism 342 and a transfer position at which the preforms 300 are transferred to the carrier members 220, and a horizontal drive cylinder 374 for moving the lifting mechanism 360 in the horizontal direction between the aforementioned two positions.

When the preforms 300 are to be transferred from the pitch changing mechanism 342 to the carrier members 220 of the conveyor means 200, the chucks 356 are moved to their inverted positions above the pitch changing member 350 by the inverting mechanism 358 when the chucks 356 have been supported at their raised positions by the lifting mechanism 360. At the positions, the chucks 356 will be opened by the chuck drive cylinder 364.

When the pitch changing member 350 of the pitch changing mechanism 342 holds the preforms 300 and is in a position corresponding to the receiving/removing mechanism 346, the horizontal drive cylinder 374 is energized to slide the chucks 356 and inverting mechanism 358 supported by the lifting mechanism along the horizontal guide 372 toward the pitch changing mechanism 342.

The lifting mechanism 360 then moves the chucks 356 downward to the pitch changing member 350.

As the chucks 356 are closed by the chuck drive cylinder 364, the chucks 356 will grasp the necks of the preforms 300 supported by the pitch changing member 350 at the preform support recesses 348. Under such a state, the lifting mechanism 360 is again actuated to move the chucks 356 to their raised positions at which the inverting mechanism 358 in turn inverts the chucks 356 toward the carrier members 220. At the same time, the horizontal drive mechanism 362 moves the chucks 356 horizontally toward the carrier members 220. Thus, the chucks 356 will be located above the carrier members 220 under such a state that the preforms 300 are inverted with the necks 324 thereof oriented downward.

The lifting mechanism 360 is then actuated to move the chucks 356 downward. Conveyor pins 236 in the carrier members 220 will be inserted into the respective preforms 300 held by the chucks 356 to support them. Under such a state, the chuck drive cylinder 364 is actuated to open the chucks 356. The opened chucks 356 are then moved by the horizontal drive mechanism 362 horizontally to the pitch changing mechanism 342. The preforms 300 are transferred from the pitch changing mechanism 342 to the carrier members 220. Thus, the carrier members 220 may convey the preforms 300.

Figure 9:
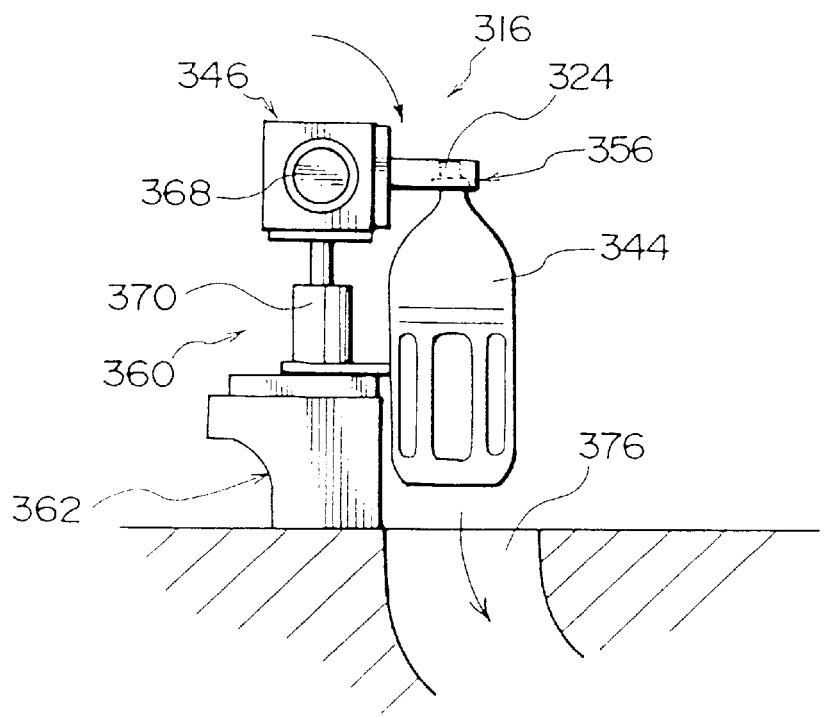
FIG. 9 is a side view showing the receiving/removing section of FIG. 8 under its removal state.
Figure 10:
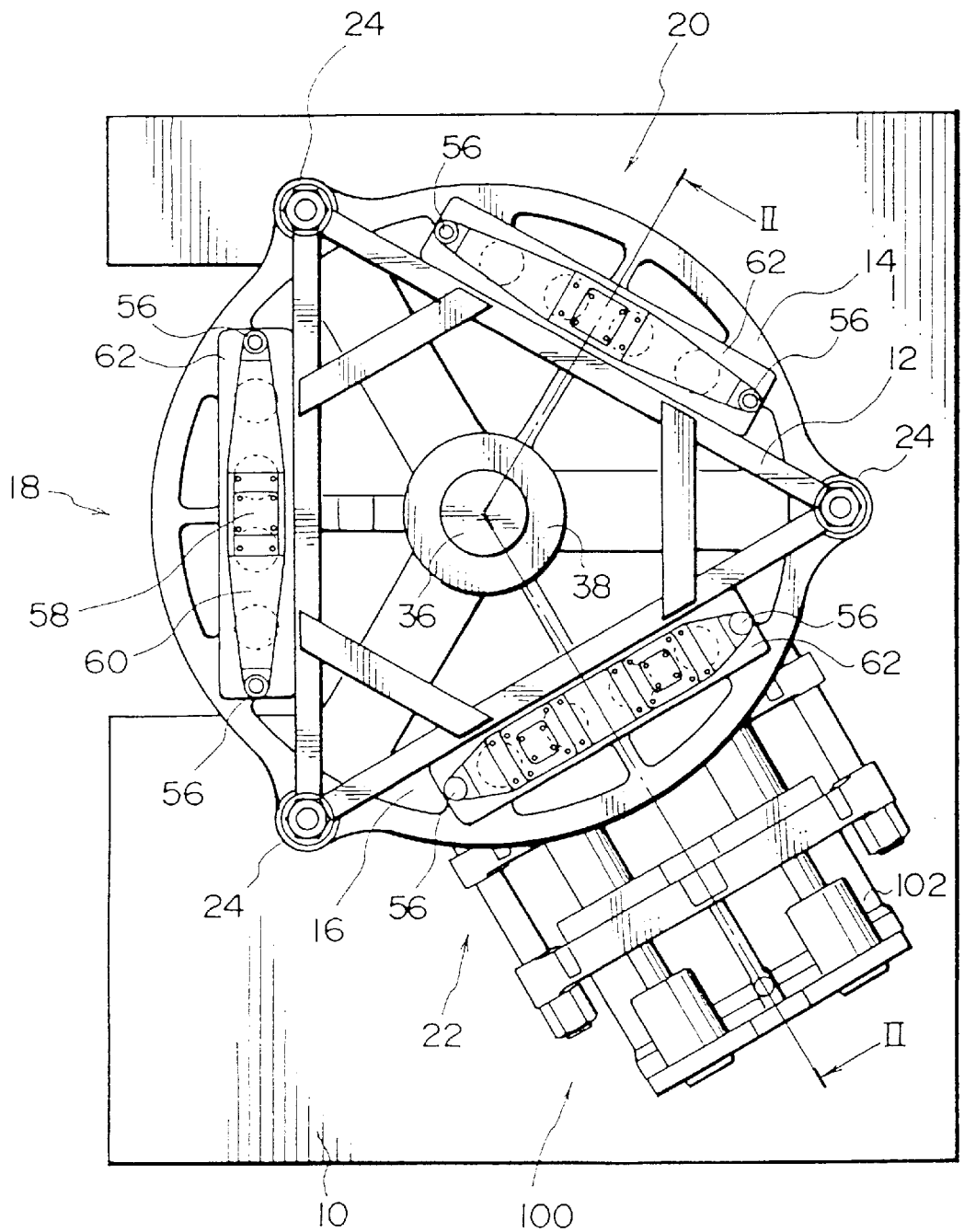
FIG. 10 is a plan view of one embodiment of a heat-resistant container molding apparatus constructed in accordance with the present invention.
Figure 11:
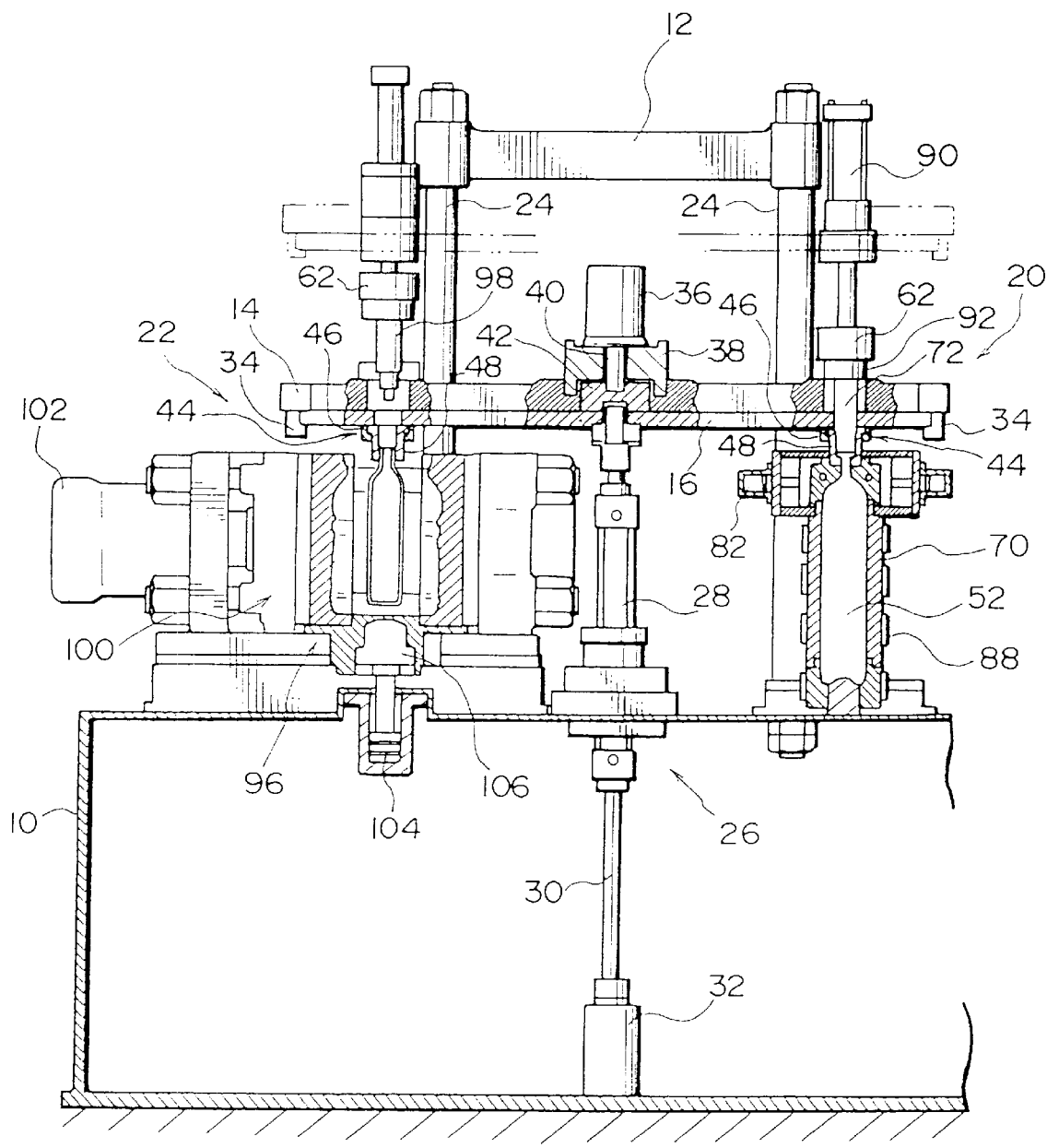
FIG. 11 is a vertical sectional view taken along a line II—II in FIG. 10.

When the final products 344 formed by the heat-resistant container molding section 304 have been moved to the receiving/removing section 202, the receiving/removing mechanism 346 causes the chucks 356 to grasp the inverted final products 344 at their necks and also the inverting mechanism 358 to invert the final products 344, as shown in FIG. 9. Under such a state, the chucks 356 are opened to fall the final products 344 into a chute 376 through which they can externally be removed.

Thus, the receiving/removing mechanism 346 has two functions, that is, a function of receiving the preforms from the pitch changing mechanism 342 and transferring them to the carrier members 220 and another function of receiving the final products 344 formed by the heat-resistant container molding section 304 from the carrier members 220 and externally removing them. Therefore, the system can be simplified with saving of the installation space, unlike use of separate mechanisms for performing the above two functions.

FIGS. 10–19 show a heat-resistant container molding apparatus and method according to a further embodiment of the present invention.

The heat-resistant container molding apparatus will first be described. The apparatus comprises a machine base 10, an upper fixed plate 12 mounted above the machine base 10, an upper base plate 14 located between the machine base 10 and the upper fixed plate 12 and a rotatable plate 16 rotatably mounted on the underside of the upper base plate 14.

A molding space is formed between the machine base 10 and the rotatable plate 16. Receiving/removing section 18, heat treatment section 20 and final molding section 22 are angularly located equidistantly spaced away from one another by 120 degrees through which the rotatable plate 16 is angularly rotated and stopped.

The upper fixed plate 12 is fixedly mounted on the top ends of three tie rods 24 upstanding from the machine base 10 so that the top ends of the three tie rods 24 will be connected together.

The upper base plate 14 is mounted below the upper fixed plate 12 and movable vertically along the tie rods 24. The upper base plate 14 can also be moved up and down by an upper base plate drive device 26 which is disposed between the machine base 10 and the upper base plate 14.

The upper base plate drive device 26 comprises an upper base plate lifting cylinder 28 mounted on the machine base 10 and an upper base plate lifting rod 30 extendible from and retractable through the upper base plate lifting cylinder 28. The top end of the upper base plate lifting rod 30 is rotatably connected to a connecting block 42 which is rotatably mounted on the upper base plate 14 at its center. The bottom end of the upper base plate lifting rod 30 is extendible into the machine base 10. The machine base 10 includes a stopper 32 which engages the bottom end of the upper base plate lifting rod 30 to limit the downward movement of the upper base plate 14.

The rotatable plate 16 is rotatably supported by a guide rail 34 mounted on the underside of the upper base plate 14 at its outer edge and can be moved up and down through the up-and-down movement of the upper base plate 14.

The rotatable plate 16 is repeatedly rotated and stopped for every 120 degrees by a rotary actuator 36. The rotary actuator 36 is mounted on a mounting block 38 on the top of the upper base plate 14 and includes an output shaft 40 which is connected to the top of the rotatable plate 16 through a connecting block 42.

The underside of the rotatable plate 16 includes three neck support fixing plates 44 mounted thereon which are disposed equidistantly through 120 degrees, that is, at positions respectively corresponding to the receiving/removing section 18, heat treatment section 20 and final molding section 22.

Each of the neck support fixing plates 44 is formed by a pair of split plates 46 which support neck support members 48 each comprising mold halves for grasping the neck of a molding. The split plates 46 are biased against each other for closing and may be separated using wedge apertures 50 which are formed therein at the opposite ends. When the neck of a molding is grasped by the neck support member 48, the molding may be conveyed through the receiving/removing section 18, heat treatment section 20 and final molding section 22. The neck support fixing plate 44 includes four of such neck support members 48 such that four moldings can be conveyed at the same time.

Figure 12A:
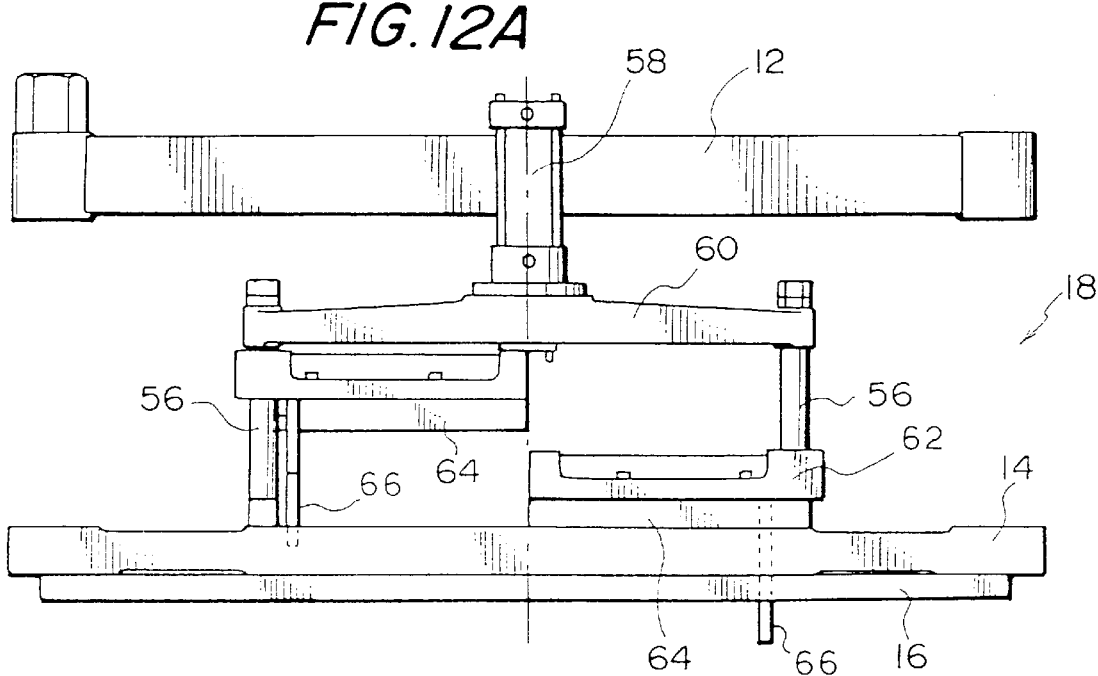
FIGS. 12A, 12B and 12C are respectively front, side and top views of the receiving/removing section.

The receiving/removing section 18, on one hand, receives primary moldings 52 blow-molded from preforms and on the other hand, removes final products 54 blow molded in the final stage. More particularly, as shown in FIG. 12A, a pair of guide rods 56 stand on the upper base plate 14. The tops of the guide rods 56 are fixedly connected to a cylinder fixing plate 60 on which an opening cam drive cylinder 58 is mounted. The opening cam drive cylinder 58 moves a movable plate 62 along the guide rods 56 between the upper base plate 14 and the cylinder fixing plate 60. The underside of the movable plate 62 supports an opening cam fixing plate 64 from which a pair of opening cams 66 suspend at positions respectively corresponding to the wedge apertures 50.

Figure 12B:
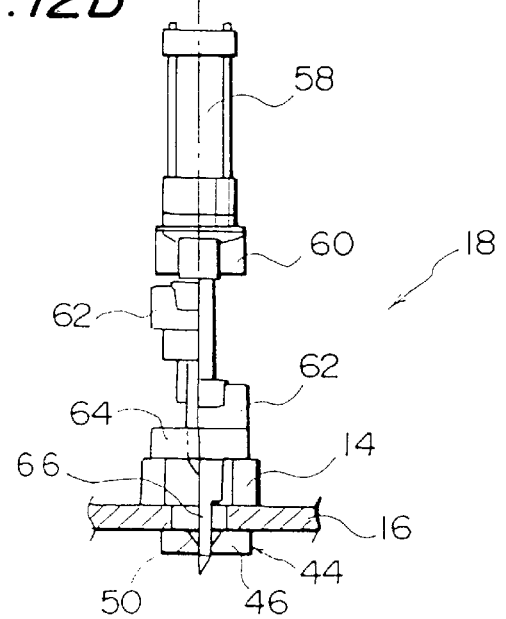
Figure 12C:
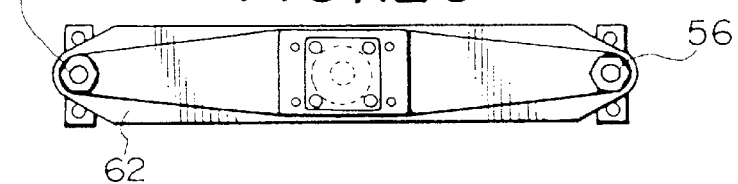
Figure 13:
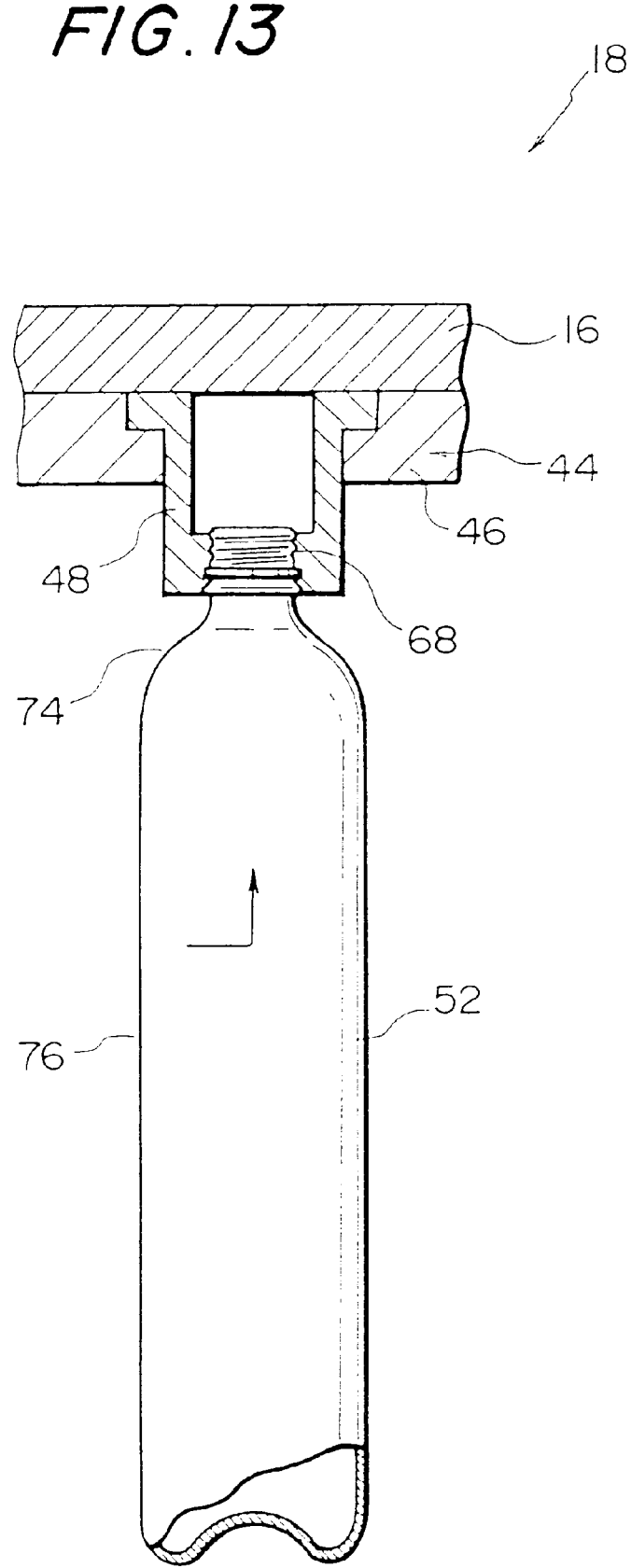
FIG. 13 is a longitudinal sectional view showing a primary molding supported at the receiving/removing section.
Figure 14:
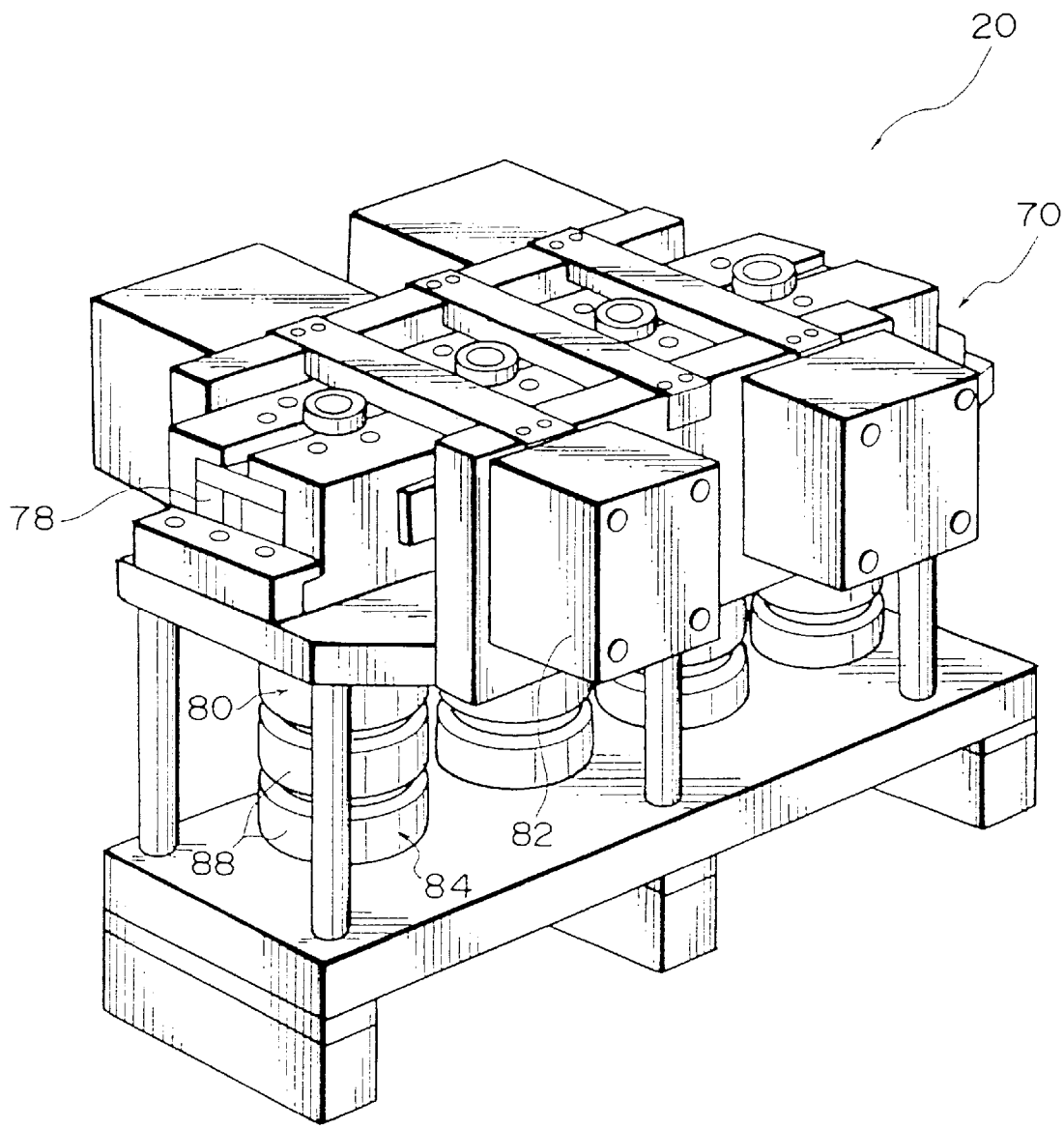
FIG. 14 is a perspective view of the heat treatment molds in the heat treatment section.
Figure 15:
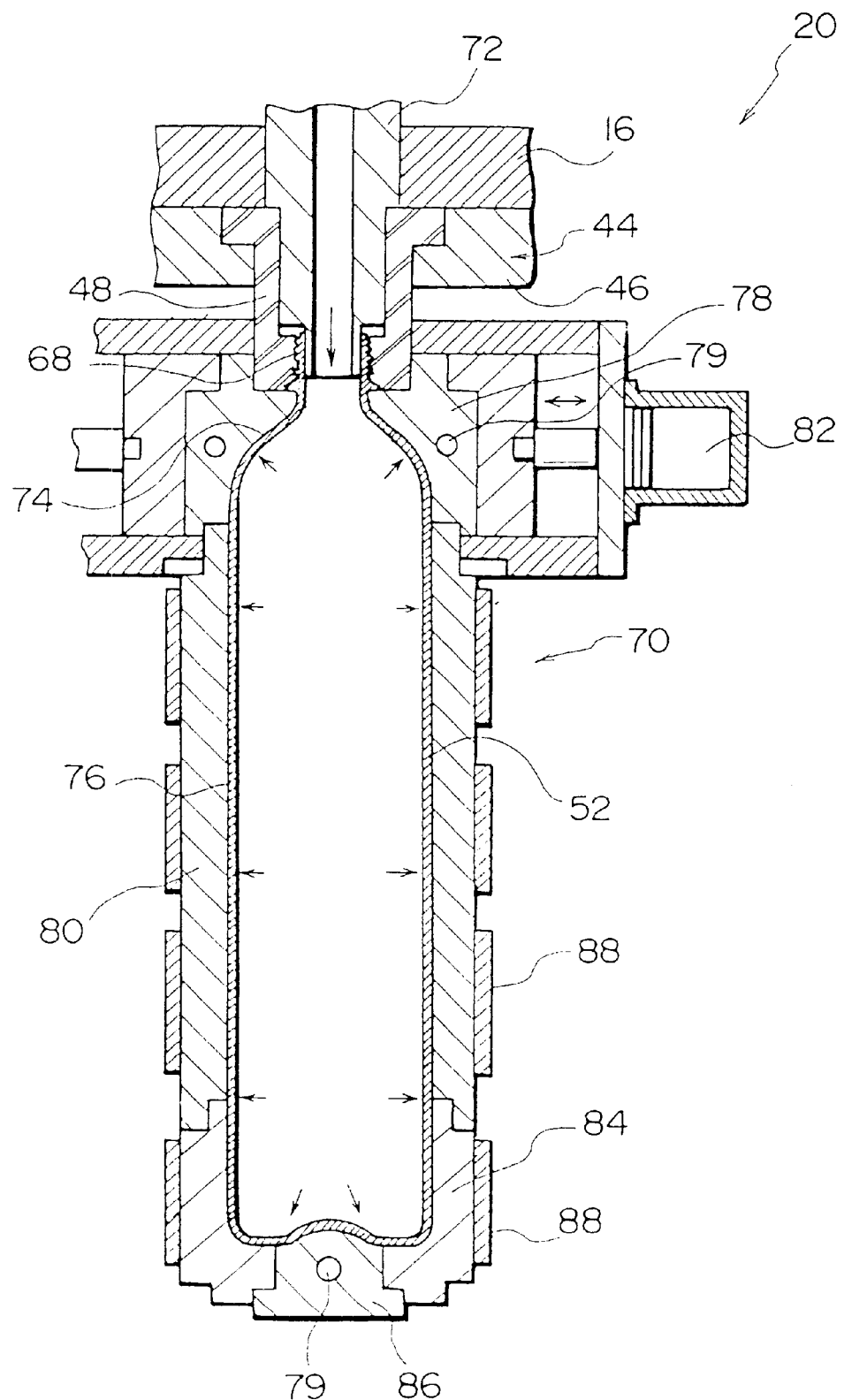
FIG. 15 is a longitudinal sectional view through one of the heat treatment molds shown in FIG. 14.
Figure 16A:
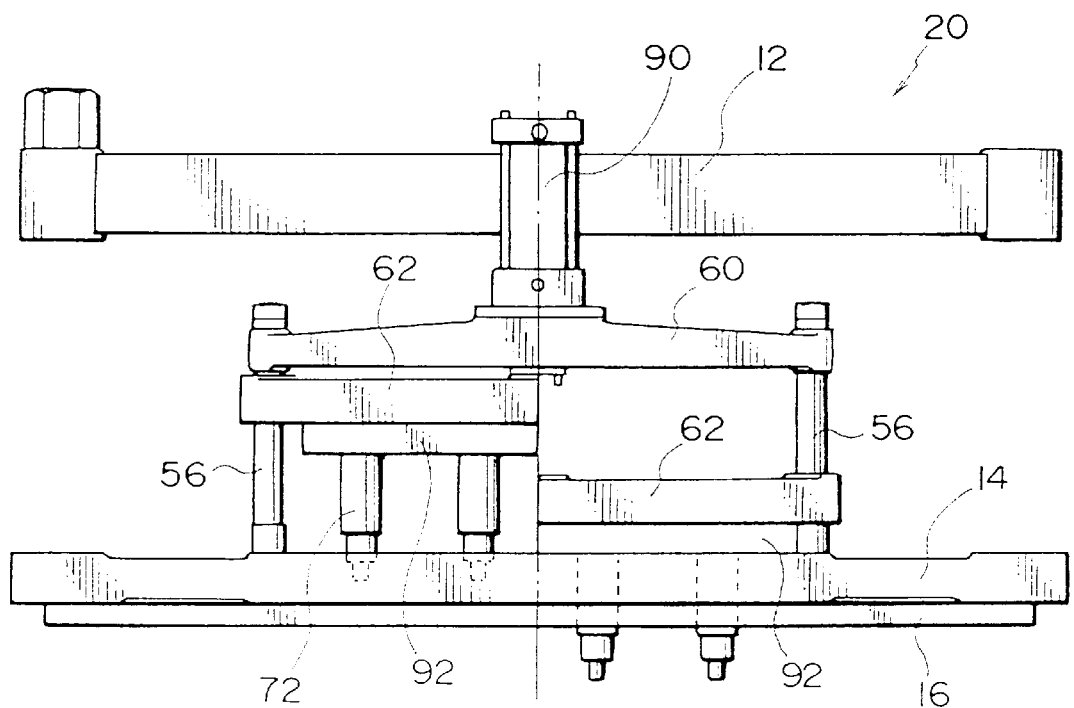
FIGS. 16A and 16B are respectively front and plan views showing the heat treatment core molds in the heat treatment section.
Figure 16B:
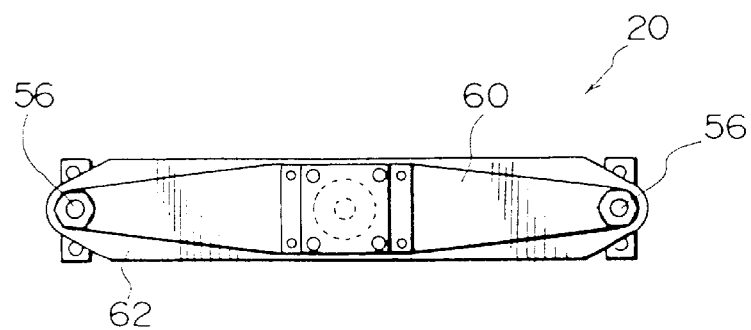
Figure 17:
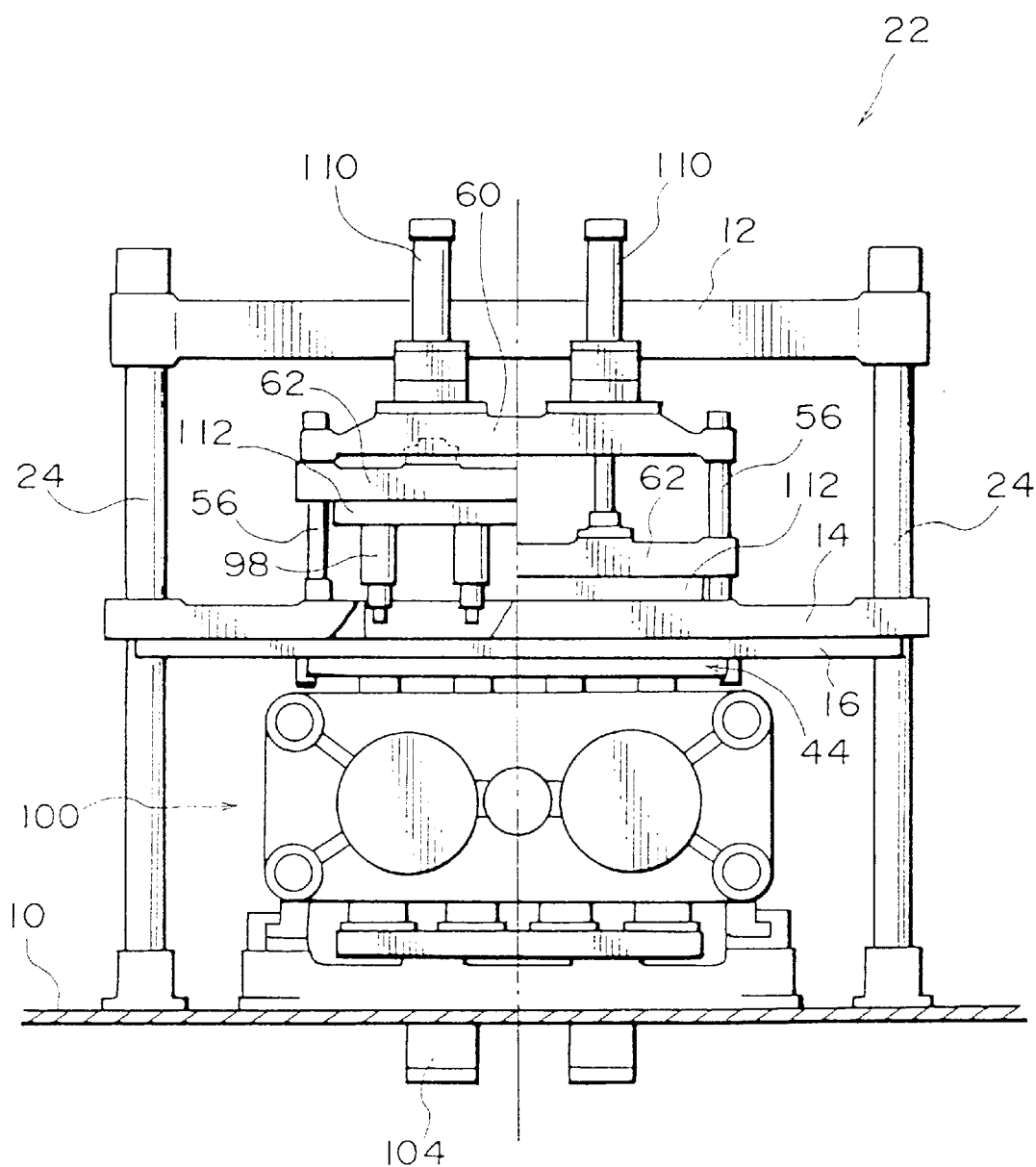
FIG. 17 is a front view of the blow core mold in the final molding section in up and down states.
Figure 18:
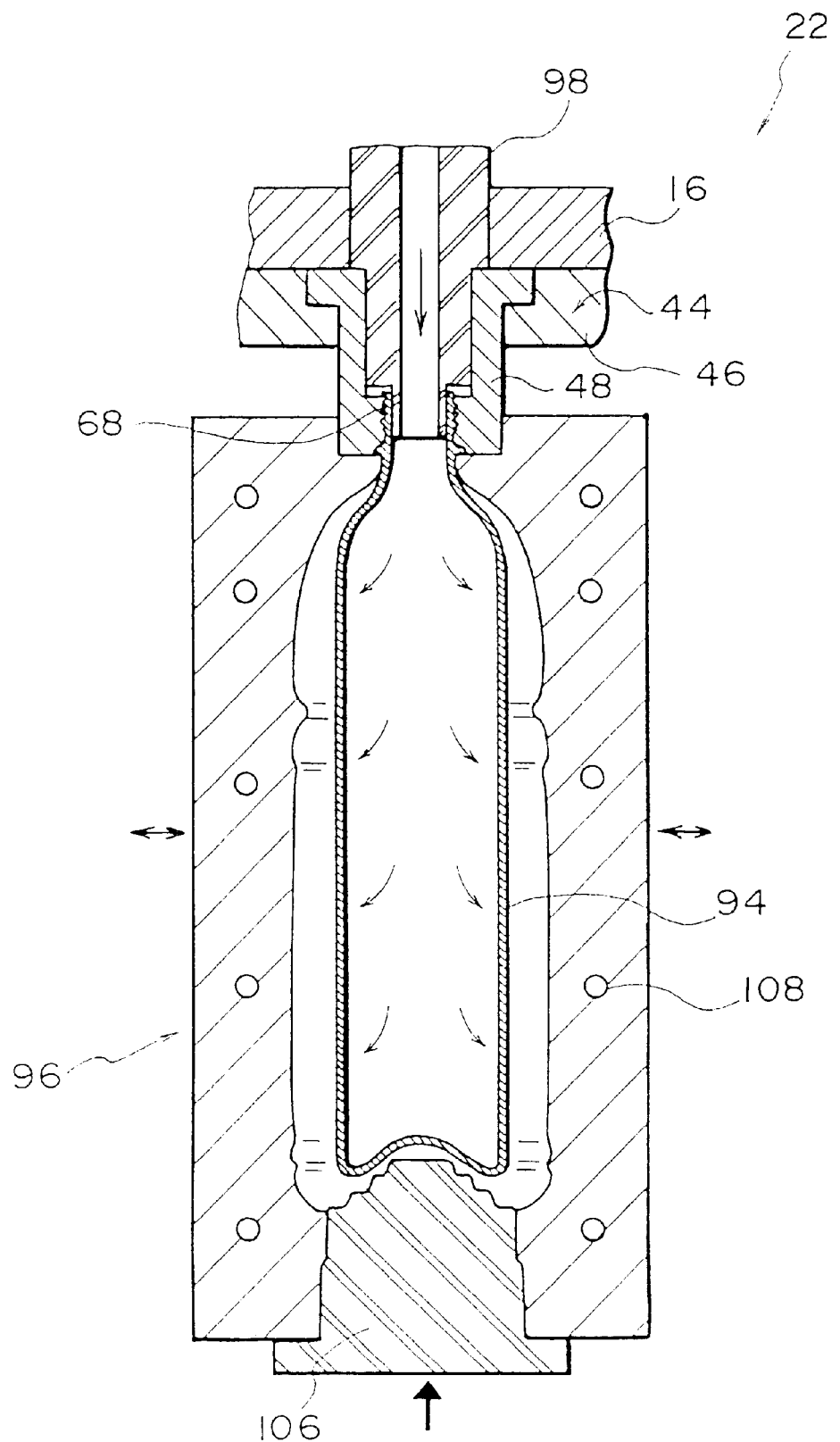
FIG. 18 is a longitudinal sectional view of the final blow mold in the final molding section.

When the upper base plate 14 is in its lower limit position and if the opening cams 66 are downward moved by the opening cam drive cylinder 58, the bottom tips of the opening cam 66 are inserted into the wedge apertures 50 of the neck support fixing plate 44 to force and expand the split plates 46 for opening the neck support member 48, as shown in FIG. 12B. Under such a state, the neck of a primary molding 52 can be inserted into the neck support member 48. The upward movement of the opening cams 66 closes the neck support member 48 to grasp the neck 68 of the primary molding. The downward movement of the opening cams 66 opens the neck support member 48 to release the neck 68 of the final product 54 for removal. Although not illustrated, the receiving/removing section 18 performs the transfer of the primary moldings 52 or final products 54 relative to the neck support members 48 through any known robot device or the like.

The heat treatment section 20 comprises four heat treatment molds 70 mounted on the machine base 10 and four heat treatment core molds 72 provided at the upper base plate 14 for up-and-down movement. A primary molding 52 is brought into contact with the inner wall of a heat treatment mold 70 and heated while pressurizing the interior of the primary molding 52. Such a primary molding 52 has been molded through a primary blow mold having its internal dimensions slightly larger than those of the desired final product 54 in the other stage.

In such a case, the primary molding 52 is enlarged from the neck 68 toward a shoulder 74 to form a barrel portion 76 in the form of a cylinder having substantially no irregularity in the axial direction thereof. Thus, each of the heat treatment molds 70 is formed by a split shoulder heating block 78 corresponding to the shoulder 74 of the primary molding 52 and a barrel heating block 80 corresponding to the cylindrical barrel portion 76 and having a circumferentially continuous pot-shaped configuration. The shoulder heating block 78 can be opened and closed by an opening/closing cylinder 82. The heat treatment mold 70 also includes a bottom heating block 84 including a push-up bottom heating block 86. The outer walls of the barrel and bottom heating blocks 80, 84 are surrounded by band heaters 88 while the shoulder and push-up bottom heating blocks 78, 86 include internal heaters 79. The internal heaters 79 may be replaced by any internal piping means through which a temperature regulating medium is circulated. Since the inner wall of the heat treatment mold 70 is formed corresponding to the configuration of the primary molding 52 and only the shoulder heating block 78 corresponding to the shoulder 74 of the primary molding is formed to be of a split type, the number of expensive split mold parts can be minimized to reduce the manufacturing cost and installation space of the entire system while taking a small-sized opening/closing cylinder 82.

Each of the heat treatment core molds 72 is mounted on the movable plate 62 through a heat treatment core mold fixing plate 92 and moved up and down by a core drive cylinder 90 placed on the cylinder fixing plate 60. Thus, the heat treatment core mold 72 can be opened or closed relative to the heat treatment mold 70. The heat treatment core mold 72 is supplied with air through the proximal end thereof. The air is conducted into the primary molding 52 to pressurize the interior thereof so that the primary molding 52 will be brought into contact with the inner wall of the heat treatment mold 70 and heated. This improves the heat transfer and can prevent the primary molding 52 from being shrunk during the heat treatment to avoid uneven wall thickness.

In such a case, the pressure of air conducted into the primary molding 52 is in the range of 2–10 kg/cm². The heat treatment temperature is between 150° C. and 220° C. at the shoulder and between 150° C. and 220° C. at the barrel while the heat treatment time is between five seconds and ten seconds. If the heat treatment time is less than five seconds, an intermediate molding 94 will have its unstable shrinkage after the heat treatment, resulting in variability of the size from one intermediate molding 94 to the other. If the heat treatment time exceeds ten seconds, it is not preferable in viewpoint of the molding cycle.

The rate of shrunk volume of the primary molding 51 to the intermediate molding 94 after the heat treatment is set to be between 10% and 30% (5–15% in the axial direction and 0–15% in the circumferential direction). The temperature of the intermediate molding 94 immediately before it is finally blow-molded is set to be about 180° C. Thus, the size of the intermediate molding 94 will be substantially equal to or slightly smaller than that of the final product 54 after the heat treatment.

The final molding section 22 includes final blow mold 96 mounted on the machine base 10 and four blow core molds 98 which are provided at the upper base plate 14 and can be moved up and down. The final blow mold 96 is heated and thereafter blow-molds a heat treated intermediate molding 94 into a final product 54.

The final blow mold 96 is of a split type that is defined by four cavity surfaces forming the configuration of the final product 54. The final blow mold 96 is clamped by a mold clamping device 100. The mold clamping device 100 has a drive cylinder 102 only on one side. The mold clamping device 100 opens or closes the split mold halves in synchronism with each other through a synchronizing mechanism (not shown). The final blow mold 96 includes a bottom mold 106 driven by a bottom mold drive cylinder 104 and an internal heater 108 for heating the molding to a temperature equal to or higher than the desired heat resisting temperature when the molding is blow-molded into a final product. This can remove any strain produced in the final product. The internal heater 108 may be replaced by any internal piping through which a temperature regulating medium is circulated.

A blow core mold 98 is mounted on the movable plate 62 through a blow core mold fixing plate 112. The blow core mold 98 is driven up and down by a blow core mold drive cylinder 110 on the cylinder fixing plate 60 against the final blow mold 96. The blow core mold 98 also conducts blow air into the interior of the molding.

In the final molding section 22, the intermediate molding 94 is in a softened state after it has been heat-treated. The intermediate molding 94 is blow-molded into a final product 54 within the heated final blow mold 96, and the final product 54 is heat treated by the heated final blow mold 96.

The heat treatment condition in the final blow molding step is selected such that the temperature of the final blow mold is between 90–100° C., the blow molding time is between five and ten seconds and the pressure of blow air is between 15–30 kg/cm². By heat-treating the final product within the final blow mold in such a manner, any strain can be removed to improve the heat resisting property. Since the size of the intermediate molding 94 is designed to be substantially equal to or slightly smaller than that of the final product 54, the molding will not substantially be stretched in the blow molding step. In addition, the molding will not substantially be oriented since the intermediate molding 94 is placed at a temperature sufficiently higher than the appropriate stretching temperature. Therefore, a strain will not substantially be produced under such a condition. Since the size of the intermediate molding 94 is substantially equal to or slightly smaller than that of the final product 54, any pinch can be avoided on clamping in the final blow molding step.

A method of molding a heat-resistant container using the aforementioned heat-resistant container molding apparatus will be described mainly with reference to FIG. 19.

First of all, a primary molding 52 is blow-molded from an injection-molded preform by a primary blow molding device other than the heat-resistant container molding apparatus of the present invention. The primary molding 52 is slightly larger than the final product 54. The condition of molding the primary molding 52 is selected such that the surface temperature of the preform during the primary molding step is between about 100° C. and about 120° C., the primary blow mold is at room temperature, and the size of the primary molding is 10% larger than that of the final product 54. The primary molding 52 is transferred to the receiving/removing section 18 through a transfer device such as a robot device (not shown).

In the receiving/removing section 18, the upper base plate 14 is now positioned at its lower limit position by the upper base plate drive device 26. Each neck support member 48 is placed in its open position by moving the opening cams 66 downward into the wedge aperture 50 of the neck support fixing plate 44 under the actuation of the opening cam drive cylinder 58. Under such a state, as shown in FIG. 19(A), the neck 68 of the primary molding 52 is inserted into the neck support member 48 and then the opening cams 66 are moved upward and separated from the wedge aperture 50 under the action of the opening cam drive cylinder 58. Thus, the transfer of the primary molding 52 to the neck support member 48 will terminate. At this time, the upper base plate 14 is moved to its upper limit position at which the stage is shifted to the conveyance stage under the action of the upper base plate drive device 26. The upper limit position is set at a height whereat the lower end of the primary molding 52 does not come in contact with the heat treatment mold 70 of the heat treatment section 20. Under such a state, the rotary actuator 36 is energized to rotate the rotatable plate 16 through 120 degrees. When the rotatable plate 16 is stopped, the primary molding 52 may be conveyed to the heat treatment section 20, as shown in FIG. 19(B). During this rotation, the opening cams 66, heat treatment core mold 72 and blow core mold 98 are at their retracted positions above the rotatable plate 16. Thus, the rotatable plate 16 can reliably be rotated.

In the heat treatment section 20, as shown in FIG. 19(B), the primary molding 52 is located above the heat treatment mold 70 in which the shoulder heating block 78 is now placed in its open position under the action of the opening/closing cylinder 82. The upper base plate drive device 26 is then actuated to move the upper base plate 14 downward to the lower limit position at which the primary molding 52 is inserted into the heat treatment mold 70. Since the shoulder heating block 78 is in its open position at this time, the primary molding 52 will certainly be inserted into the heat treatment mold 70. The heat treatment mold 70 is set to have its inner wall slightly larger than that of the primary molding 52 such that the primary molding 52 can be prevented from being damaged when it is inserted into the heat treatment mold 70.

As shown in FIG. 19(C), the shoulder heating block 78 is then closed by the opening/closing cylinder 82 and the heat treatment core mold 72 is downward moved by the heat treatment core drive cylinder 90 to engage with the neck support member 48. Air is then conducted into the interior of the primary molding 52 through the heat treatment core mold 72 to pressurize the interior of the primary molding 52 such that the primary molding 52 will be brought into contact with the inner wall of the heat treatment mold 70 for heat treatment. The heat treatment is carried out under the heat treatment temperature and time condition set such that the intermediate molding 94 is substantially equal to or slightly smaller than the final product 54. For example, the pressure of conducted air is about 2–10 kg/cm², the shoulder temperature is 150–220° C., the barrel temperature is 150–220° C. and the heat treatment time is 5–10 seconds. Under such a setting, the primary molding 52 is molded into the intermediate molding 94 having its rate of shrunk volume between 10–30% (5–15% in the axial direction and 0–15% in the circumferential direction) after the heat treatment. The heat treatment is carried out such that the temperature of the intermediate molding 94 becomes about 180° C. immediately before the final blow molding step.

When the heat treatment terminates, the opening/closing cylinder 82 is actuated to open the shoulder heating block 78 while the core drive cylinder is actuated to move the heat treatment core mold 72 upward for retracting it above the rotary plate. The upper base plate drive device 26 is actuated to move the upper base plate 14 to its upper limit position so that the heat treated primary molding 52 will be drawn from the heat treatment mold 70. The primary molding 52 is then transferred to the next step. In such a case, the primary molding 52 drawn from the heat treatment mold 70 becomes the intermediate molding 94 which is in its softened state with shrinkage.

The rotary actuator 36 is then actuated to rotate the rotatable plate 16 through 120 degrees such that the intermediate molding 94 will be conveyed to the final molding section 22.

In the final molding section 22, as shown in FIG. 19(D), the final blow mold 96 is now placed in its open state under the action of the mold clamping device 100. The blow core mold 98 is retracted above the rotatable plate 16 by the blow core mold drive cylinder 110. The upper base plate drive device 26 is then actuated to move the upper base plate 14 downward to its lower limit position so that the intermediate molding 94 is positioned within the blow mold 96. As shown in FIG. 19(E), the blow mold 96 is clamped by the mold clamping device 100. The blow core mold drive cylinder 110 is then actuated to move the blow core mold 98 downward to engage with the neck support member 48. The blow air is conducted into the interior of the intermediate molding 94 through the blow core mold 98 and blow-molded into the final product 54 within the final blow mold 96.

In such a case, the final product 54 is heated by the final blow mold 96 after the latter has been heated by the internal heater 108. The heat treatment condition in the final blow molding step is selected such that the temperature of the final blow mold 96 is between 90–100° C., the blow molding time is between five and fifteen seconds and the blow air pressure is between 15–30 kg/cm². In the final blow molding step, the final blow mold 96 is heated to a temperature equal to or higher than the desired heat resisting temperature such that any strain produced in the final product 54 when it is blow-molded will be removed. Since the intermediate molding 94 is substantially equal to or slightly smaller than the final product 54, the intermediate molding 94 will not be substantially stretched in the final blow molding step. In addition, the temperature of the intermediate molding 94 is sufficiently higher than the appropriate stretching temperature. Therefore, the intermediate molding 94 will not also be substantially oriented. As a result, a strain will not substantially be produced. Furthermore, the intermediate molding 94 will not be pinched by the final blow mold 96 since the intermediate molding 94 is substantially equal to or slightly smaller than the final product 54.

After termination of the final blow molding step, the mold clamping device 100 is again actuated to open the final blow mold 96 while the blow core mold drive cylinder 110 is actuated to move the blow core mold 98 upward above the rotatable plate 16. The upper base plate 14 is thereafter moved upward to its conveyance position, as shown in FIG. 19(F).

Thereafter, the rotatable plate 16 is rotated through 120 degrees, the upper base plate 14 is downward moved and the opening cams 66 are downward moved. Thus, the final product 54 may be removed at the receiving/removing section 18, as shown in FIG. 19(G).

The steps (A) to (G) will be repeated sequentially.

Figure 20:
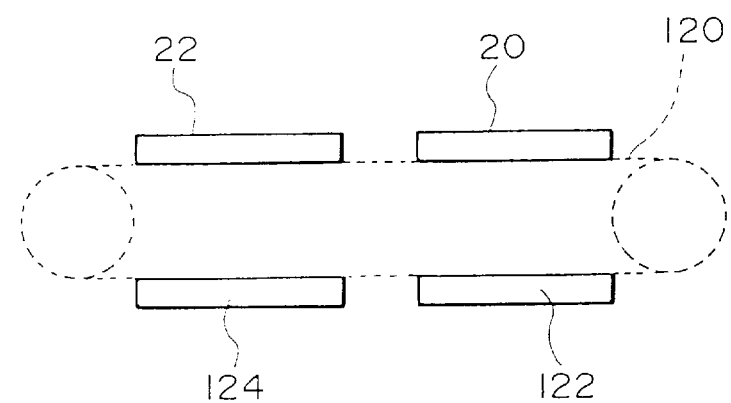
FIG. 20 illustrates a part of another embodiment of a heat-resistant container molding apparatus constructed in accordance with the present invention.

FIG. 20 shows a further embodiment of a heat-resistant container molding apparatus constructed in accordance with the present invention. This embodiment uses a linear type conveyor device 120. This heat-resistant container molding apparatus functions in a manner similar to those of the embodiments shown in FIGS. 10–19 wherein a primary molding blow-molded from a preform is conveyed through the receiving section 122, heat treatment section 20, final molding section 22 and removing section 124 so that the molding will be heat-treated and blow-molded into the final product.

Figure 21:
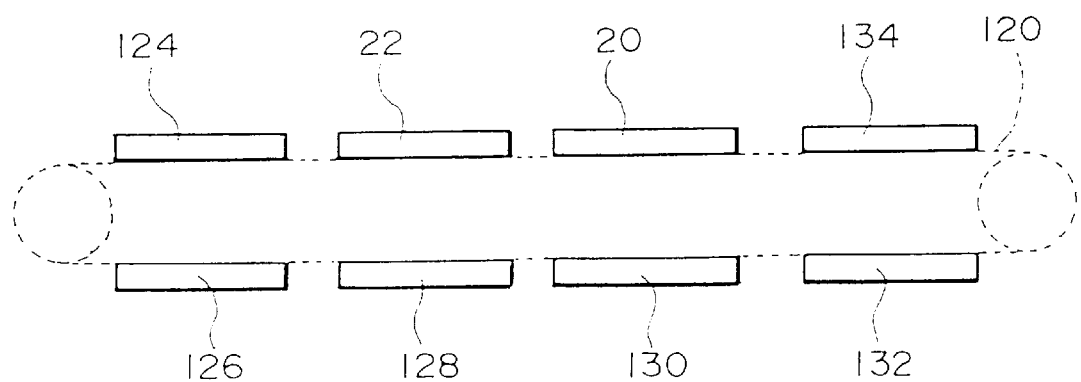
FIG. 21 illustrates a part of still another embodiment of a heat-resistant container molding apparatus constructed in accordance with the present invention.

FIG. 21 shows a further embodiment of a heat-resistant container molding apparatus constructed in accordance with the present invention.

This embodiment also uses a linear type conveyor device 120. The heat-resistant container molding apparatus performs the heat treatment and final molding by conveying an injection molded preform through a receiving section 126, primary heating section 128, secondary heating section 130, temperature regulating section 132, intermediate blow molding section 134, heat treatment section 20, final molding section 22 and removing section 124, as in the embodiment of FIGS. 1 and 2.

The present invention is not limited to the aforementioned embodiments, and various modifications can be made within the scope of the invention.

For example, in the embodiment shown in FIGS. 10–19, the drive devices for the upper base plate and rotatable plate may be replaced by any of various other drive devices.

In the embodiment of FIGS. 10–19, the heat treatment and final blow molds are fixed while the upper base plate is upward moved to retract the moldings above the heat treatment and blow molds. However, the present invention may also be applied to a case where the upper base plate is fixed and the heat treatment and final blow molds are movable.

The number of containers to be simultaneously molded may be freely selected rather than four as in the aforementioned embodiments.

If a plurality of heat treatment sections are disposed in series or parallel between the primary molding section and the final molding section, the heat treatment time can be prolonged longer than that of a single heat treatment section.

Thus, a desired heat treatment may be applied depending on the wall thickness of the final product.

We claim:

1. A blow molding apparatus for forming a heat-resistant container, said apparatus comprising:

a primary molding section for blow-molding a preform into a primary molding, said primary molding section including a primary blow mold having split molds with inner walls defining a cavity, said cavity having an axial length greater than the axial length of said heat-resistant container;

a heat treatment section for heat treating the primary molding at a temperature which progresses crystallization thereof, said heat treatment section including a heat treatment mold having split molds with inner walls defining a cavity, means for heating the split molds and means for pressurizing an interior of the primary molding within said heat treatment mold in order to bring the primary molding into contact with the inner walls of said split molds while the split molds are heated to heat treat the primary molding and thereby remove residual stress produced in said primary molding, said heat treatment mold having a cavity configuration substantially equal to that of said primary blow mold and different from the outer surface of the heat-resistant container, thereby obtaining an intermediate molding which is heat shrunk after being removed from said heat treatment mold; and a final molding section for blow-molding the intermediate molding into the heat-resistant container, said final molding section including a heated final blow mold having split molds with inner walls defining a cavity with an axial length which is less than the axial length of the primary blow mold and heat treatment mold.

2. The blow molding apparatus according to claim 1, further comprising a receiving section for receiving the preform to be primarily molded and a removing section for removing the heat-resistant container, and wherein said primary molding, heat treatment and final molding sections are located adjacent to one another.

3. The blow molding apparatus according to claim 1, further comprising conveyor means for conveying the preform to the primary molding section, the primary molding to the heat treatment section and the intermediate molding to the final molding section, wherein said conveyor means forms a substantially rectangular conveyor path and said primary molding, heat treatment and final molding sections are disposed on a long side of said rectangular conveyor path.

4. The blow molding apparatus according to claim 3, further comprising a receiving section for receiving the preform to be primarily molded wherein the receiving station is disposed on a short side of said conveyor path.

5. The blow molding apparatus according to claim 4, wherein said receiving section operates as a removing section for removing the heat-resistant container.

6. The blow molding apparatus according to claim 2, further comprising a plurality of heating units for heating the preform disposed between said receiving section and said primary molding section.

7. The blow molding apparatus according to claim 3, further comprising a receiving section for receiving the preform to be primarily molded and a plurality of heating units for heating the preform received at said receiving section, and wherein said plurality of heating units are disposed on at least one side of said conveyor path excluding the long side on which said primary molding, heat treatment and final molding sections are disposed.

8. The blow molding apparatus according to claim 7, wherein each of said plurality of heating units has a rotary mechanism for rotating the preform.

9. The blow molding apparatus according to claim 8, wherein said conveyor means includes carrier members for conveying moldings to be simultaneously molded upside down and a conveyor chain mounted on said carrier members and engaged with sprockets which are disposed in said conveyor path at corners thereof, each of said carrier members having a rotating sprocket engaged with preform rotating means in each of said heating units.

10. The blow molding apparatus according to claim 1, wherein said intermediate molding has a rate of shrunk volume between 10 to 30% relative to the volume of said primary molding.

11. The blow molding apparatus according to claim 2, further comprising conveyor means for intermittently conveying a given number of preforms to be simultaneously molded to said primary molding section and a given number of moldings to be simultaneously molded to said heat treatment and final molding sections respectively, and wherein each of said primary molding, heat treatment and final molding sections includes a mold clamping mechanism for clamping the split molds, said primary molding, heat treatment and final molding sections are rectilinearly disposed in a transfer direction.

12. A blow molding apparatus for forming a heat-resistant container, said apparatus comprising:

a primary molding section for blow-molding a preform into a primary molding, said primary molding section including a primary blow mold having split molds with inner walls defining a cavity, said cavity having an axial length greater than an axial length of said heat-resistant container;

a heat treatment section for heat treating of the primary molding to obtain an intermediate molding, said heat treatment section including a heat treatment mold having split molds with inner walls defining a cavity, means for heating the split molds and means for pressurizing an interior of the primary molding within the heat treatment mold in order to bring the primary molding into contact with the inner walls of the split molds while the split molds are heated, said heat treatment mold having a cavity configuration substantially equal to that of said primary blow mold and different from the outer surface of the heat-resistant container;

a final molding section for blow-molding the heat treated intermediate molding into the heat-resistant container, said final molding section including a heated final blow mold having split molds with inner walls defining a cavity with an axial length which is less than the axial length of the primary blow mold and heat treatment mold; and a conveyor means for intermittently conveying said preform, said primary molding and said heat treated intermediate molding to said primary molding, heat treatment and final molding sections, respectively, wherein each of said primary molding, heat treatment and final molding sections includes a mold clamping mechanism for clamping the split molds, and wherein said primary molding, heat treatment and final molding sections are rectilinearly disposed in a transfer direction.

* * * * *